US011314409B2

(12) United States Patent
Klein et al.

(10) Patent No.: US 11,314,409 B2
(45) Date of Patent: Apr. 26, 2022

(54) MODELESS AUGMENTATIONS TO A VIRTUAL TRACKPAD ON A MULTIPLE SCREEN COMPUTING DEVICE

(71) Applicant: Microsoft Technology Licensing, LLC., Redmond, WA (US)

(72) Inventors: Christian Klein, Duvall, WA (US); Andrew Stuart Glass, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/207,840

(22) Filed: Dec. 3, 2018

(65) Prior Publication Data

US 2020/0174653 A1 Jun. 4, 2020

(51) Int. Cl.
*G06F 3/04883* (2022.01)
*G06F 3/0354* (2013.01)
*G06F 3/04886* (2022.01)

(52) U.S. Cl.
CPC ...... *G06F 3/04883* (2013.01); *G06F 3/03545* (2013.01); *G06F 3/03547* (2013.01); *G06F 3/04886* (2013.01); *G06F 2203/04808* (2013.01)

(58) Field of Classification Search
CPC ....... G06F 3/03545; G06F 2203/04808; G06F 40/279
See application file for complete search history.

(56) References Cited

U.S. PATENT DOCUMENTS

| 6,029,214 A | 2/2000 | Dorfman et al. |
|---|---|---|
| 6,701,296 B1 | 3/2004 | Kramer et al. |
| 6,885,361 B1 | 4/2005 | Harvill et al. |
| 9,996,153 B1 | 6/2018 | Trotta |
| 2004/0169636 A1 | 9/2004 | Park et al. |
| 2006/0071915 A1 | 4/2006 | Rehm |
| 2006/0248478 A1 | 11/2006 | Liau |
| 2010/0231505 A1 | 9/2010 | Iwata |
| 2011/0022393 A1 | 1/2011 | Waller et al. |

(Continued)

FOREIGN PATENT DOCUMENTS

| CN | 102236455 A | 11/2011 |
|---|---|---|
| CN | 108153450 A | 6/2018 |

(Continued)

OTHER PUBLICATIONS

"International Search Report and Written Opinion Issued in PCT Application No. PCT/US19/063125", dated Apr. 3, 2020, 12 Pages.

(Continued)

*Primary Examiner* — Andrea C Leggett

(57) ABSTRACT

The disclosed technologies address various technical and user experience problems by augmenting the functionality provided by virtual on-screen trackpads without requiring users to switch between modes. In this way, users can access extended functionality without interfering with expected traditional trackpad functionality (e.g. moving a cursor, clicking, and scrolling). In particular, technologies are disclosed for modeless digital pen input to a virtual trackpad, modeless gestures for summoning user interfaces, modeless gestures utilizing position relative to adjacent user interfaces, and modeless cursor control and interaction with virtual touch targets.

20 Claims, 21 Drawing Sheets

(56) References Cited

U.S. PATENT DOCUMENTS

| | | |
|---|---|---|
| 2011/0047459 A1 | 2/2011 | Van Der Westhuizen |
| 2011/0209097 A1 | 8/2011 | Hinckley |
| 2011/0273380 A1 | 11/2011 | Martin |
| 2012/0030606 A1* | 2/2012 | Zhang .................. G06F 3/0234 715/773 |
| 2012/0127071 A1 | 5/2012 | Jitkoff et al. |
| 2012/0154295 A1 | 6/2012 | Hinckley et al. |
| 2013/0113717 A1 | 5/2013 | Van Eerd |
| 2013/0120434 A1* | 5/2013 | Kim .................. G06F 3/04883 345/594 |
| 2013/0203469 A1 | 8/2013 | Cho et al. |
| 2013/0249806 A1 | 9/2013 | Crisan |
| 2013/0249870 A1 | 9/2013 | Slaby et al. |
| 2013/0300674 A1 | 11/2013 | Davidson |
| 2014/0123049 A1 | 5/2014 | Buxton et al. |
| 2014/0191977 A1 | 7/2014 | Feng et al. |
| 2014/0306897 A1 | 10/2014 | Cueto |
| 2014/0337804 A1 | 11/2014 | Hwang et al. |
| 2014/0363074 A1 | 12/2014 | Dolfing et al. |
| 2014/0365949 A1* | 12/2014 | Xia .................. G06F 17/276 715/780 |
| 2015/0130727 A1* | 5/2015 | Kim .................. G06F 3/0383 345/173 |
| 2015/0153949 A1 | 6/2015 | Yeung et al. |
| 2015/0193051 A1 | 7/2015 | Hung |
| 2016/0054797 A1 | 2/2016 | Tokubo et al. |
| 2016/0124532 A1 | 5/2016 | Wolff et al. |
| 2016/0170547 A1 | 6/2016 | Zhang et al. |
| 2016/0187973 A1 | 6/2016 | Shankar et al. |
| 2016/0202778 A1 | 7/2016 | Su |
| 2016/0246369 A1 | 8/2016 | Osman |
| 2016/0342207 A1 | 11/2016 | Beran |
| 2016/0349989 A1* | 12/2016 | Yu .................. G06F 3/04847 |
| 2017/0086519 A1 | 3/2017 | Vigano' et al. |
| 2017/0109020 A1 | 4/2017 | Sliter et al. |
| 2017/0177077 A1 | 6/2017 | Yang et al. |
| 2017/0231304 A1 | 8/2017 | Provencher |
| 2017/0262056 A1 | 9/2017 | Osman |
| 2017/0285932 A1 | 10/2017 | Hastings et al. |
| 2018/0004406 A1 | 1/2018 | Jung et al. |
| 2018/0032203 A1* | 2/2018 | Sepulveda .................. G06F 1/1615 |
| 2018/0046269 A1 | 2/2018 | Kaplan |
| 2018/0074637 A1 | 3/2018 | Rosenberg et al. |
| 2018/0107277 A1 | 4/2018 | Keller et al. |
| 2018/0120985 A1 | 5/2018 | Wallace et al. |
| 2018/0260796 A1 | 9/2018 | Mcdonald et al. |
| 2018/0328808 A1 | 11/2018 | Jourdan et al. |
| 2018/0335921 A1 | 11/2018 | Karunamuni et al. |
| 2018/0356893 A1 | 12/2018 | Soni |
| 2019/0005733 A1 | 1/2019 | Wehner et al. |
| 2019/0102927 A1 | 4/2019 | Yokokawa |
| 2019/0129473 A1 | 5/2019 | Hu et al. |
| 2020/0026352 A1 | 1/2020 | Wang et al. |
| 2020/0174566 A1 | 6/2020 | Klein et al. |
| 2020/0174567 A1 | 6/2020 | Klein et al. |
| 2020/0174660 A1 | 6/2020 | Klein et al. |

FOREIGN PATENT DOCUMENTS

| | | |
|---|---|---|
| WO | 2012028773 A1 | 3/2012 |
| WO | 2014133217 A1 | 9/2014 |
| WO | 2016036509 A1 | 3/2016 |
| WO | 2016097841 A2 | 6/2016 |

OTHER PUBLICATIONS

"International Search Report and Written Opinion Issued in PCT Application No. PCT/US19/063120", dated Feb. 27, 2020, 12 Pages.

"International Search Report and Written Opinion Issued in PCT Application No. PCT/US19/063128", dated Feb. 27, 2020, 11 Pages.

"Non Final Office Action Issued in U.S. Appl. No. 16/207,794", dated Dec. 19, 2019, 24 Pages.

"Notice of Allowance Issued in U.S. Appl. No. 16/207,936", dated Oct. 4, 2019, 10 Pages.

"Non Final Office Action Issued in U.S. Appl. No. 16/207,973", dated Nov. 4, 2019, 13 Pages.

"International Search Report and Written Opinion Issued in PCT Application No. PCT/US2019/063118", dated Jan. 31, 2020, 11 Pages.

"Non Final Office Action Issued in U.S. Appl. No. 16/207,892", dated Mar. 5, 2020, 28 Pages.

"Final Office Action Issued in U.S. Appl. No. 16/207,973", dated Mar. 18, 2020, 15 Pages.

"Final Office Action Issued in U.S. Appl. No. 16/207,794", dated Jul. 1, 2020, 26 Pages.

"Final Office Action Issued in U.S. Appl. No. 16/207,973", dated Oct. 19, 2020, 12 Pages.

"Non Final Office Action Issued in U.S. Appl. No. 16/207,892", dated Jul. 23, 2020, 33 Pages.

"Non Final Office Action Issued in U.S. Appl. No. 16/207,973", dated Jul. 16, 2020, 11 Pages.

"Non Final Office Action Issued in U.S. Appl. No. 16/207,973", dated Jan. 25, 2021, 8 Pages.

"Non Final Office Action Issued in U.S. Appl. No. 16/207,892", dated Mar. 30, 2021, 42 Pages.

"International Search Report and Written Opinion Issued in PCT Application No. PCT/US2019/063119", dated Jun. 24, 2020, 23 Pages.

"Final Office Action Issued in U.S. Appl. No. 16/207,892", dated Dec. 24, 2020, 37 Pages.

"Final Office Action Issued in U.S. Appl. No. 16/207,892", dated Aug. 27, 2021, 37 Pages.

"Notice of Allowance Issued in U.S. Appl. No. 16/207,794", dated Jun. 7, 2021, 17 Pages.

Annett, Michelle, "(Digitally) Inking in the 21st Century", In Journal of IEEE Computer Graphics and Applications, vol. 37, Issue 1, Jan. 2017, pp. 92-99.

Lee, et al., "SketchInsight: Natural Data Exploration on Interactive Whiteboards Leveraging Pen and Touch Interaction", In Journal of IEEE Pacific Visualization Symposium, Apr. 14, 2015, pp. 199-206.

* cited by examiner

MODELESS AUGMENTATIONS TO A VIRTUAL TRACKPAD ON A MULTIPLE SCREEN COMPUTING DEVICE

BACKGROUND

Trackpads, which might also be referred to as touchpads, are user input pointing devices having a specialized flat surface that is capable of detecting finger contact. The surface can translate the position and motion of a user's finger, or fingers, to a relative position on the screen of a computing device. The tracked position and motion of the user's finger can then be used to move an on-screen cursor or to perform other types of functionality. Trackpads also include functionality for performing an activation operation, such as by clicking a physical button or tapping the trackpad. The functionality provided by traditional trackpads, however, is typically limited to cursor control, selection and, potentially, basic single or multi-touch gestures.

Virtual on-screen trackpads enable touch-screen displays to provide functionality that is similar to traditional physical trackpads. Existing virtual onscreen trackpads, however, merely replicate, often poorly, the behaviors of traditional trackpads. Moreover, on-screen regions that support traditional trackpad functions in addition to other functionality rely on users to perform explicit mode switches, which require additional steps and take the user out of their workflow. The user input required to perform mode switches can also be difficult to remember and confusing to users, thereby resulting in inadvertent or incorrect user input, which unnecessarily consumes computing resources, like processor cycles and memory. Performing a mode switch can also result in the execution of additional program code, which can also consume computing resources like processor cycles and memory.

It is with respect to these and other technical challenges that the disclosure made herein is presented.

SUMMARY

Technologies are disclosed herein that can modelessly augment the functionality provided by virtual trackpads. The disclosed technologies address the technical problems described above by augmenting the functionality provided by virtual on-screen trackpads without requiring users to switch between modes. In this way, users can access extended functionality without interfering with expected traditional trackpad functionality (e.g. moving a cursor, clicking, and scrolling) and, therefore, have an improved user experience. Additionally, the utilization of computing resources can be reduced through simplified user interaction and execution of less program code as compared to previous modal virtual trackpad solutions that require mode switching. Other technical benefits not specifically mentioned herein can also be realized through implementations of the disclosed subject matter.

The technologies disclosed herein are implemented in conjunction with a multiple screen computing device in some configurations. Multiple screen computing devices come in multiple form factors, such as a two screen hinged device resembling a traditional laptop computer. A device configured in this way includes a first display device located in the same location as a display on a traditional laptop computer. The first display device may or may not be touch-sensitive in various configurations. The first display device provides a first display region that occupies all or a portion of the physical display.

In some configurations of a multiple screen computing device, a second display device is located where a physical keyboard is traditionally located on a laptop computer. The second display device might occupy the entire area where a physical keyboard is traditionally located or might only occupy a portion of that area. The second display device is equipped with sensors for detecting user input, such as single and multi-touch gestures. The second display device provides a second display region that occupies all or a portion of the physical display.

An edge (e.g. the bottom edge) of the first display region is arranged adjacent to and parallel with an edge (e.g. the top edge) of the second display region. The distance between the two display regions might be greater or smaller depending upon the particular mechanical connection (e.g. a hinge) connecting the respective housings of the display devices providing the display regions. Respective sides of the first and second display regions can also be spatially aligned. As will be described in greater detail below, the spatial alignment of the display regions enables certain types of modeless gestures to be made in the second display region with respect to corresponding areas of the first display region.

The second display region can be divided into a virtual trackpad area and a virtual keyboard area. The virtual trackpad area can be utilized as a virtual trackpad. For example, the virtual trackpad can determine the position and motion of a user's finger, which can then be used to move an on-screen cursor or to perform other types of functionality. The virtual trackpad area can also be utilized to perform an activation operation such as, for example, by tapping within the virtual trackpad area. The virtual trackpad area encompasses the entire width of the second display region and is located in a portion of the second display region adjacent to the first display region in some configurations.

Modeless Digital Pen Input to a Virtual Trackpad

In one configuration, the virtual trackpad area can also receive input from a digital pen without requiring a user to change the mode of operation of the virtual trackpad. In this configuration, a user can write directly in the virtual trackpad area at any time using a digital pen. In particular, when input is received within the virtual trackpad area, the computing device determines whether the input is touch input (i.e. a user's finger) or input from a digital pen. If the input is touch input, the input is processed as touch input to a virtual trackpad to move a cursor or perform an activation operation, for example. If the input is input received from a digital pen, the input is processed as digital ink.

Processing the input as digital ink can include, but is not limited to, converting the digital ink to text and providing the text to a program for presentation of the text within a field of a user interface ("UI") presented in the first display region. Processing the input as digital ink can further include providing the digital ink to a program for presentation of the digital ink within a field of a UI presented in the second display region. Processing the input as digital ink can also include converting the digital ink to text, recognizing a command in the text, and causing the computing device to execute the command. Processing the input as digital ink might additionally include providing the digital ink to a default program for storing notes or converting the digital ink to text and providing the text to a default program for storing notes. In some configurations, it is not necessary to convert the digital ink to text. Rather, commands can be recognized directly from the digital ink such as, for instance, when the ink represents non-text information such as shapes or arrows.

Modeless Gestures for Summoning User Interfaces

In another configuration, the virtual trackpad area can be utilized to initiate the presentation of transient UIs in the second display region for performing commands or viewing information without requiring a user to change the mode of operation of the virtual trackpad area. In particular, when input is received within the virtual trackpad area, the computing device determines whether the touch input comprises a touch gesture originating outside an edge of the virtual trackpad area of the second display region and terminating inside the virtual trackpad area. For example, a user might utilize a finger, or multiple fingers, to swipe from a location outside the virtual trackpad area to a location within the virtual trackpad area.

If the computing device detects a touch gesture originating outside an edge of the virtual trackpad area of the second display region and terminating inside the virtual trackpad area, the computing device can display a transient UI in the virtual trackpad area. The transient UI might be animated as it is displayed such as, for instance, by "sliding" into the virtual trackpad area from the edge of the virtual trackpad area where the gesture originated.

In some configurations, the transient UI includes selectable UI elements, such as UI buttons or other types of UI elements. If the computing device determines that touch input has been made in the virtual trackpad area selecting one of the one or more selectable UI elements, the computing device can initiate a command corresponding to the selected UI element. For instance, a command might be initiated to launch an application that can present a UI in the first display region, switch to an already-launched application (i.e. to switch tasks), or to perform another function.

In some configurations, the display of the transient UI is removed from the virtual trackpad area in response to the selection of one of the UI elements. In other configurations, a touch gesture can be utilized to dismiss the transient UI. For example, a user might utilize a finger, or multiple fingers, to swipe from a location inside the virtual trackpad area to a location outside the virtual trackpad area to dismiss the transient UI. The display of the transient UI can also be animated as it is removed such as, for example, by "sliding" the transient UI out of the virtual trackpad area to the edge of the virtual trackpad area where the gesture terminates.

In other configurations, an input gesture made from outside an edge of the virtual trackpad area to a location inside the virtual trackpad area can perform functions based upon the relationship between the ending location of the gesture and UI elements presented in the first display region or in the keyboard area of the second display region. For example, a user might set the output volume of the computing device by swiping right from an area outside the virtual trackpad area to a location within the virtual trackpad area. The location at which the gesture ends with respect to a virtual keyboard (e.g. horizontally aligned) specifies the output volume. For instance, if the gesture ends at a location that is spatially aligned with the '1' key on the virtual keyboard, the output volume will be set to one (e.g. 10% of maximum). If the gesture ends at a location that is spatially aligned (e.g. horizontally aligned) with the '9' key on the virtual keyboard, the output volume will be set to nine (e.g. 90% of maximum). In this way, many different specific edge gestures can be performed along a common edge of the virtual trackpad area.

Modeless Gestures Utilizing Relative Position

In another configuration, the virtual trackpad area can be utilized to enable gestures having functionality that is determined based upon the starting point of the gestures relative to adjacent on-screen UI, another type of object, or a keyboard. In this configuration, a first application executing on the computing device can present a UI in a first portion of the first display region: the left half of the first display region, for example. A first portion of the virtual trackpad area is spatially aligned with the first portion of the first display region. For instance, the first portion of the virtual trackpad area might include the left half of the second display region, which is spatially aligned with the left half of the first display region.

Similarly, a second application executing on the computing device can present a UI in a second portion of the first display region: the right half of the first display region, for example. A second portion of the virtual trackpad area is spatially aligned with the second portion of the first display region. For instance, the second portion of the virtual trackpad area might include the right half of the second display region, which is spatially aligned with the right half of the first display region. In this way, one application is assigned a portion of the first display region that corresponds to a spatially aligned portion of the virtual trackpad area, and another application is assigned another portion of the first display region that is spatially aligned with another portion of the virtual trackpad area.

If the computing device receives input in the first portion of the virtual trackpad area, the computing device provides the input to the application or interprets the input (e.g. a command) with respect to the application that is presenting its UI in the adjacent portion of the first display region. For example, if input is received in the left half of the virtual trackpad area, the input will be provided to the application presenting its UI in the left half of the first display region. If the computing device receives input in the second portion of the virtual trackpad area, the computing device provides the input to the application that is presenting its UI in the adjacent portion of the first display region. For example, if input is received in the right half of the virtual trackpad area, the input will be provided to the application presenting its UI in the right half of the first display region. The input might be, for example, a multi-touch input gesture or input received from a digital pen in order to distinguish the input from traditional virtual trackpad input for controlling a cursor, for example. Specific examples of gestures include gestures for minimizing or closing windows associated with an application.

In some configurations, the computing device can detect a user input gesture that originates in an area outside the virtual trackpad area and that terminates within the virtual trackpad area. For example, a user input gesture like a swipe gesture might originate from within a keyboard area and terminate within the virtual trackpad area. Responsive to detecting such a user input gesture, the computing device can perform a command that is selected based, at least in part, upon the location at which the gesture originated. For instance, when a gesture originates on a key of a virtual keyboard and ends in the virtual trackpad area, the command can be selected based upon the particular key upon which the gesture originated.

Modeless Cursor Control and Interaction with Touch Targets

In another configuration, a display region encompassing a virtual trackpad area on a touch-sensitive display can show touch targets for initiating various types of functionality. Cursor control can be performed using the virtual trackpad area and the touch targets can be selected without changing the mode of the virtual trackpad. For example, one or more UI controls can be displayed outside a virtual trackpad area.

When selected, such as by using a touch gesture, the UI controls can initiate various types of functionality such as, for instance, launching a program or summoning a digital assistant.

In this configuration, a touch gesture can originate inside the virtual trackpad area and terminate within one of the UI controls without causing selection of the UI control. In this way, inadvertent exiting of the virtual trackpad area while performing a cursor control gesture will not cause the selection of one of the UI controls. Similarly, a touch gesture can originate inside one of the UI controls and end inside the virtual trackpad area, or another area, without causing the selection of the UI control. In this way, a cursor control gesture can be performed outside of the virtual trackpad area, even if it begins within a UI control. The starting location and timing of a user input gesture can be used to disambiguate cursor control and interactions with the touch targets, without requiring a mode switch.

In some configurations, the computing device can detect a user input gesture that originates within the virtual trackpad area and that terminates outside the virtual trackpad area. In this example, the computing device can perform a command that is selected based, at least in part, upon the object upon which the gesture terminates.

In another configuration, physical input objects can be placed on one of several regions of a virtual trackpad area to enable additional functionality such as, but not limited to, providing direct control to volume, brightness, and scrolling of a computing device. For example, a digital dial or other type of object might be placed in a virtual trackpad area and manipulated to adjust settings such as these and to perform other types of functionality.

Although the embodiments disclosed herein are primarily presented in the context of a multiple screen computing device, the disclosed technologies can also be implemented in conjunction with single-screen computing devices that utilize a single display screen to provide a first display region and a second display region. It is also to be appreciated that although generally described separately, the various embodiments described briefly above and in further detail below can be utilized in combination with one another.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
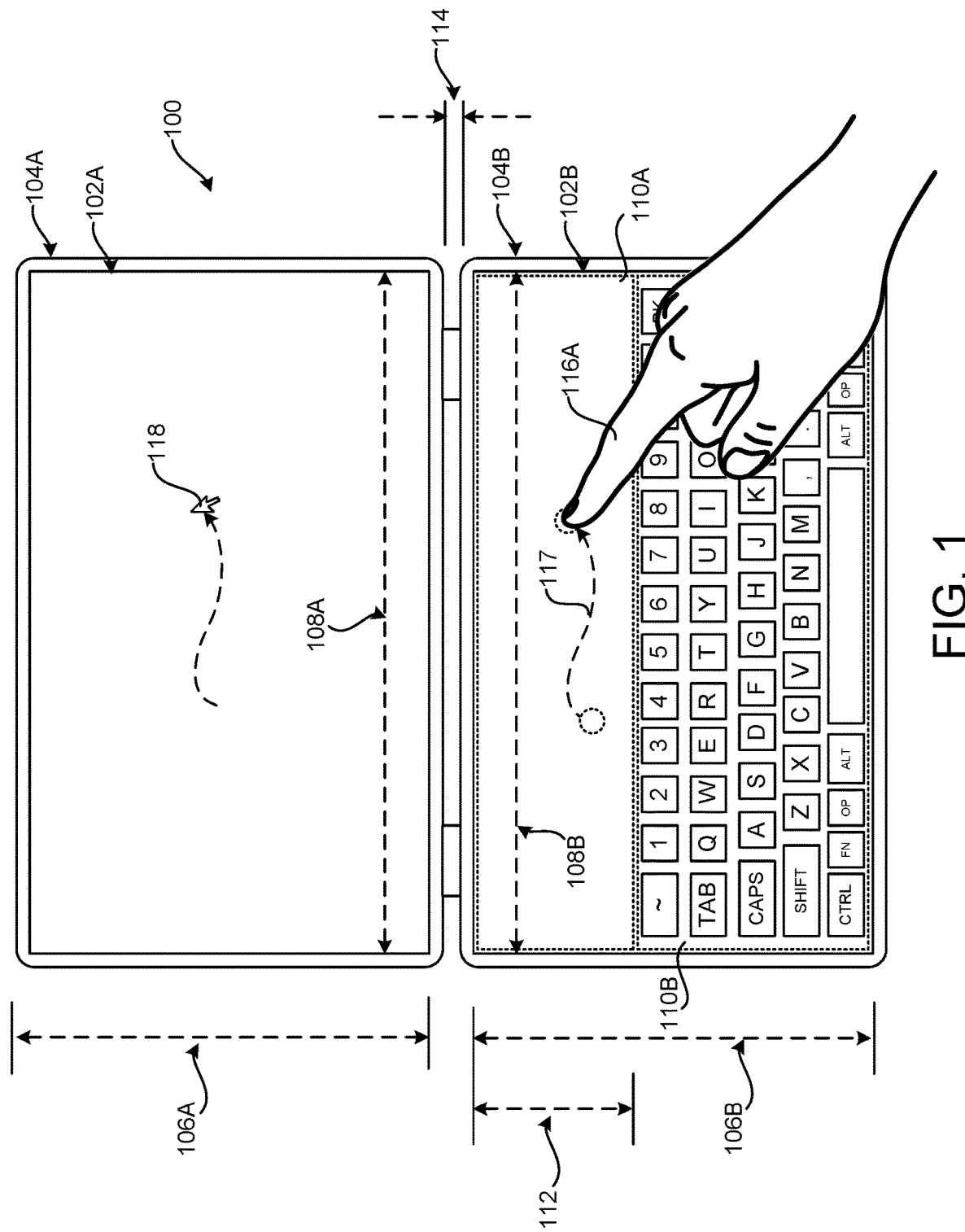
FIG. 1 is a schematic diagram illustrating aspects of the configuration and operation of a multiple screen computing device that implements the disclosed technologies in one particular configuration.

The following detailed description is directed to technologies for modelessly augmenting the functionality provided by virtual trackpads. As discussed briefly above, implementations of the disclosed technologies can enable user to access extended functionality without interfering with expected traditional trackpad functionality (e.g. moving a cursor, clicking, and scrolling). Consequently, the utilization of computing resources can be reduced through simplified user interaction and execution of less program code as compared to previous modal virtual trackpad solutions. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for modelessly augmenting the functionality provided by virtual trackpads will be described.

FIG. 1 is a schematic diagram illustrating aspects of the configuration and operation of a multiple screen computing device 100 (which might also be referred to herein as "the computing device 100" or simply "the device 100") that implements the disclosed technologies in one particular configuration. As mentioned above, multiple screen computing devices such as the computing device 100 come in multiple form factors. The computing device 100 shown in FIG. 1, for example, is configured as a two screen hinged device resembling a traditional laptop computer. The disclosed technologies can, however, also be utilized with multiple screen computing devices having other configurations. As discussed above, the disclosed technologies can also be practiced with computing devices having a single folding display screen, such as computing devices utilizing flexible screen technology.

As shown in FIG. 1, the illustrative computing device 100 includes two display devices. The first display device is mounted in a housing 104A and is located in the same location as on a traditional laptop computer when in use. The first display device provides a first display region 102A that encompasses all or a part of the physical display. The first display device may or may not be touch-sensitive.

The second display device is located in the area where a physical keyboard is traditionally located on a laptop computer and provides a second display region 102B. The second display region might occupy the entire area where a physical keyboard is traditionally located or might only occupy a portion of that area. The second display device is equipped with sensors for detecting user input, such as single and multi-touch gestures.

In the example configuration shown in FIG. 1, the first display region 102A has a height 106A. The second display region 102B has a height 106B, which may or may not be the same as the height 106A. The first display region 102A also has a width 108A and the second display region 102B has a width 108B. The width 108B of the second display region 102B is the same as the width 108A of the first display region 102A in some configurations. The width 108B of the second display region 102B can be larger or smaller than the width 108A of the first display region 102A in other configurations.

In the configuration shown in FIG. 1, the bottom edge of the first display region 102A is parallel to the top edge of the second display region 102B. The bottom edge of the first display region 102A is also adjacent to the top edge of the second display region 102B. In the example shown in FIG. 1, the housing 104A of the first display region 102A is separated from the housing 104B of the second display region by a distance 114. The distance 114 might be greater or smaller depending upon the particular mechanical connection (e.g. a hinge) connecting the housing 104A and the housing 104B. The distance 114 might also be zero in the case where two display regions are part of the same physical, potentially bendable, display screen.

In the configuration illustrated in FIG. 1, the left and right edges of the second display region 102B are aligned with the left and right edges of the first display region 102A. In this manner, the second display region 102B is horizontally aligned with the first display region 102A. As will be described in greater detail below, the spatial alignment of the first display region 102A and the second display region 102B enables certain types of modeless gestures to be made in the second display region 102B with respect to corresponding areas of the first display region 102A.

In the example configuration shown in FIG. 1, the second display region 102B has been divided into areas 110A (which might be referred to herein as "the virtual trackpad area 110A") and 110B (which might be referred to herein as "the keyboard area 110B"). The virtual trackpad area 110A can be utilized as a virtual trackpad. For example, and as shown in FIG. 1, a user might utilize a finger 116A to perform a gesture in the virtual trackpad area 110A. In this example, for instance, the user has dragged their finger horizontally in the virtual trackpad area 110A to perform a drag gesture 117. The illustrative drag gesture 117 shown in FIG. 1 causes the computing device 100 to move a cursor 118 across the first display region 102A along a path corresponding to the path of the drag gesture 117.

A user can also perform a press or tap operation in the virtual trackpad area 110A with their finger 116A in order to perform an activation operation (e.g. a mouse click) at the location of the cursor 118. Other types of functionality can also be performed in the virtual trackpad area 110A (e.g. a multi-touch gesture, like a two or three finger swipe).

In the example shown in FIG. 1, the virtual trackpad area 110A encompasses only a portion of the second display region 102B. In particular, the virtual trackpad area 110A has a width equal to the width 108B of the second display region 102B, but has a height 112 that is less than the height 106B of the second display region 102B. In this example, the height 112 of the virtual trackpad area 110A is selected to provide the functionality disclosed herein, while at the same time enabling a touch-sensitive virtual keyboard to be presented in a virtual keyboard area 110B in one configuration. The virtual trackpad area 110A can have a different height 112 in other configurations. The virtual trackpad area 110A encompasses the entire width of the second display region 102B and is located in a portion of the second display region 102B adjacent to the first display region 102A in some configurations. Additionally, the top (i.e. the top row of keys) of the keyboard area 110B is adjacent to and parallel with the bottom edge of the virtual trackpad area 110A in the illustrated example. In other configurations, the keyboard area 110B of the computing device 100 is replaced with a physical keyboard. For example, in some configurations, a physical keyboard can be placed on top of the region normally occupied by the virtual keyboard, thereby providing the tactility of physical keys but similar functionality otherwise.

It is to be appreciated that certain relative terms (e.g. height, width, top, bottom, left, right) have been utilized herein to describe the configuration of the display regions 102A and 102B shown in FIG. 1. In this regard, it is to also be appreciated that these terms have been utilized herein for ease of discussion and are not to limit the configuration of the regions 102A and 102B or the device 100. Other terms can be utilized to describe the display regions 102A and 102B and their spatial relationships to one another. Additionally, although the computing device 100 shown in FIG. 1 is illustrated in a landscape orientation, the device 100 can also be operated in a portrait configuration (i.e. by rotating the device 100 ninety degrees). Other types of multiple screen computing devices can be utilized in other configurations.

Modeless Digital Pen Input To a Virtual Trackpad

FIGS. 2-5 are schematic diagrams showing aspects of a mechanism disclosed herein for modeless digital pen input to a virtual trackpad. In the configuration shown in FIGS. 2-5, the virtual trackpad area 110A can receive input from a digital pen 202 without requiring a user to change the mode of operation of the virtual trackpad area 110A.

Figure 2:
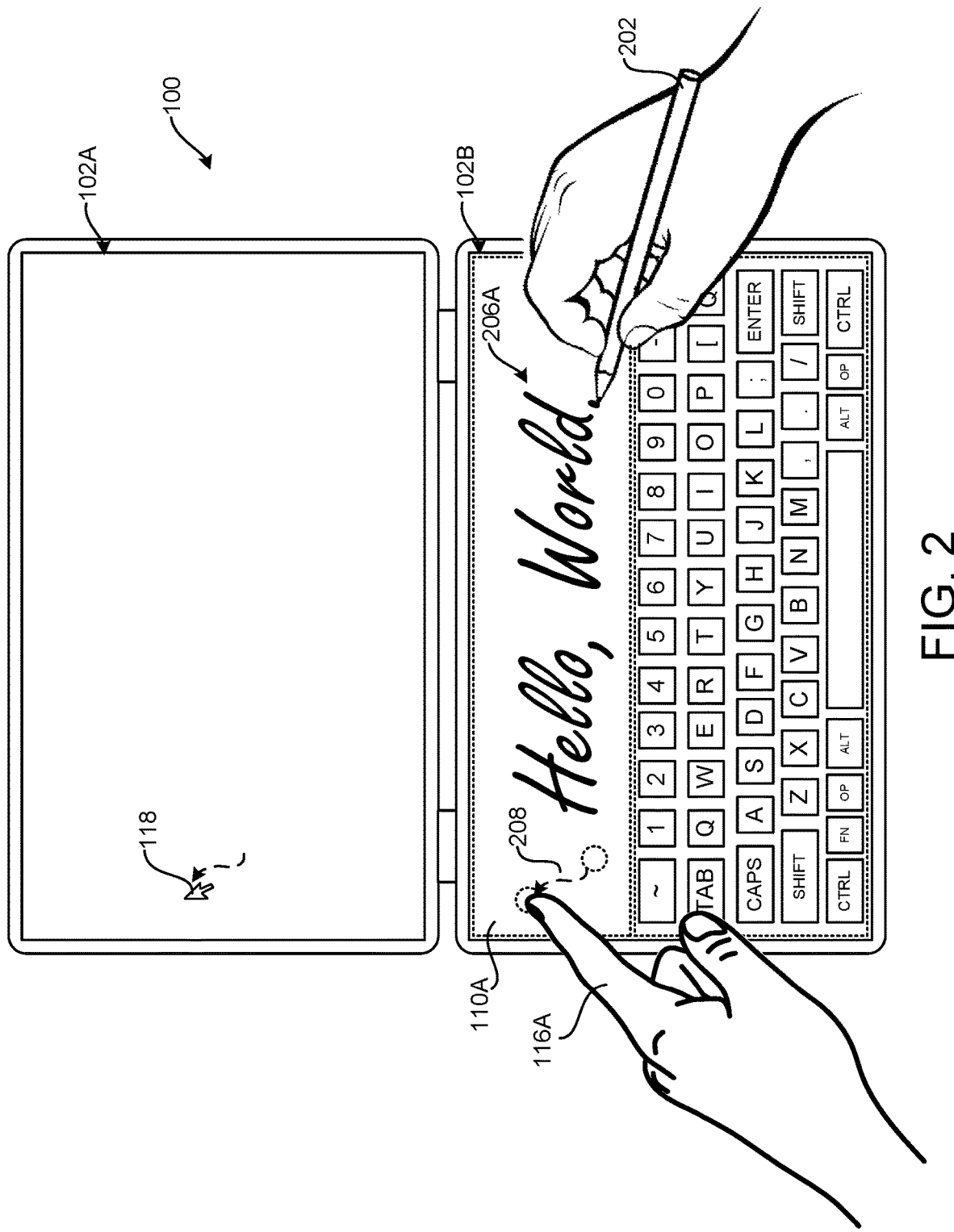
FIGS. 2-5 are schematic diagrams showing aspects of a mechanism disclosed herein for modeless digital pen input on a virtual trackpad.
Figure 3:
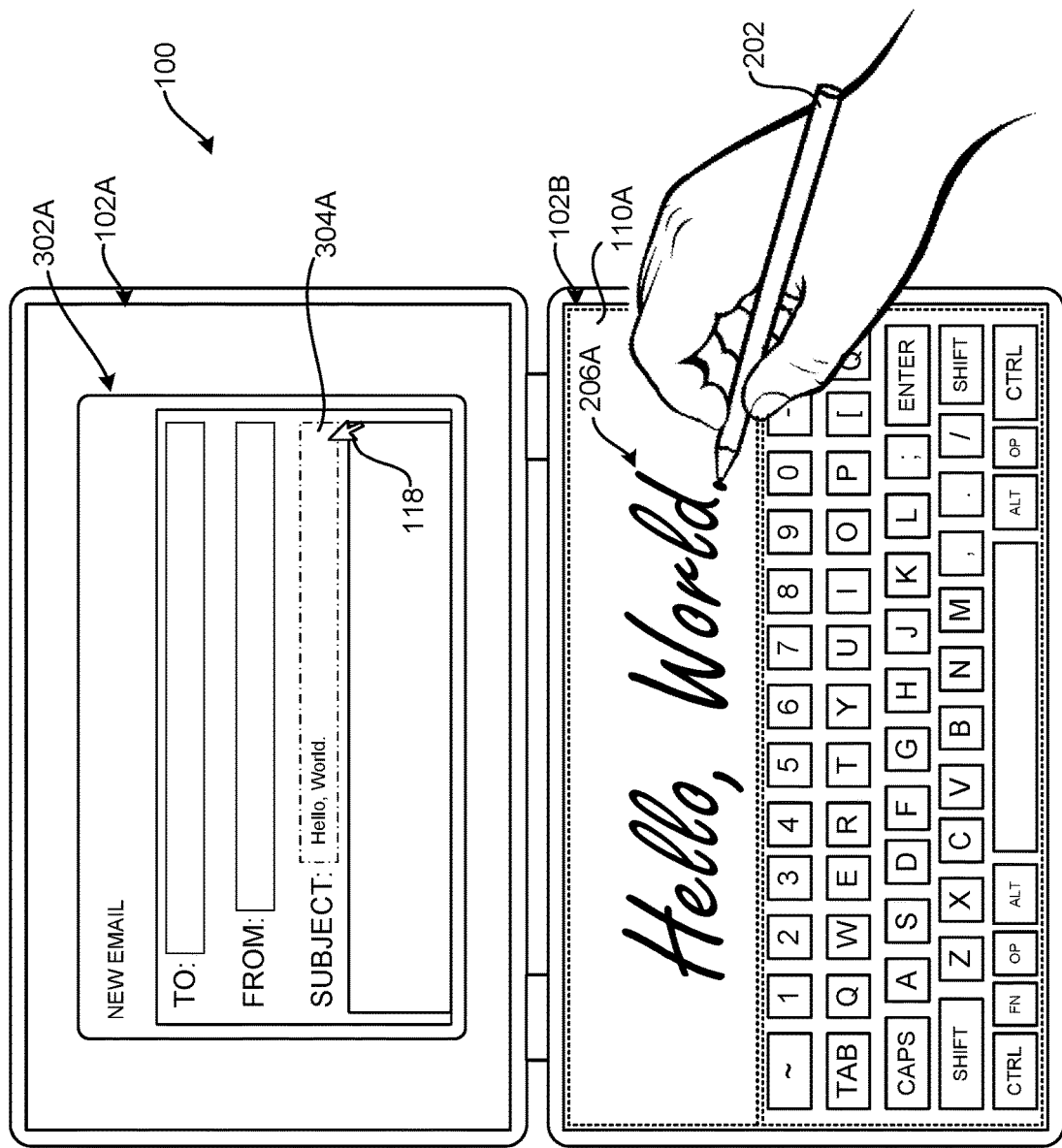
Figure 4:
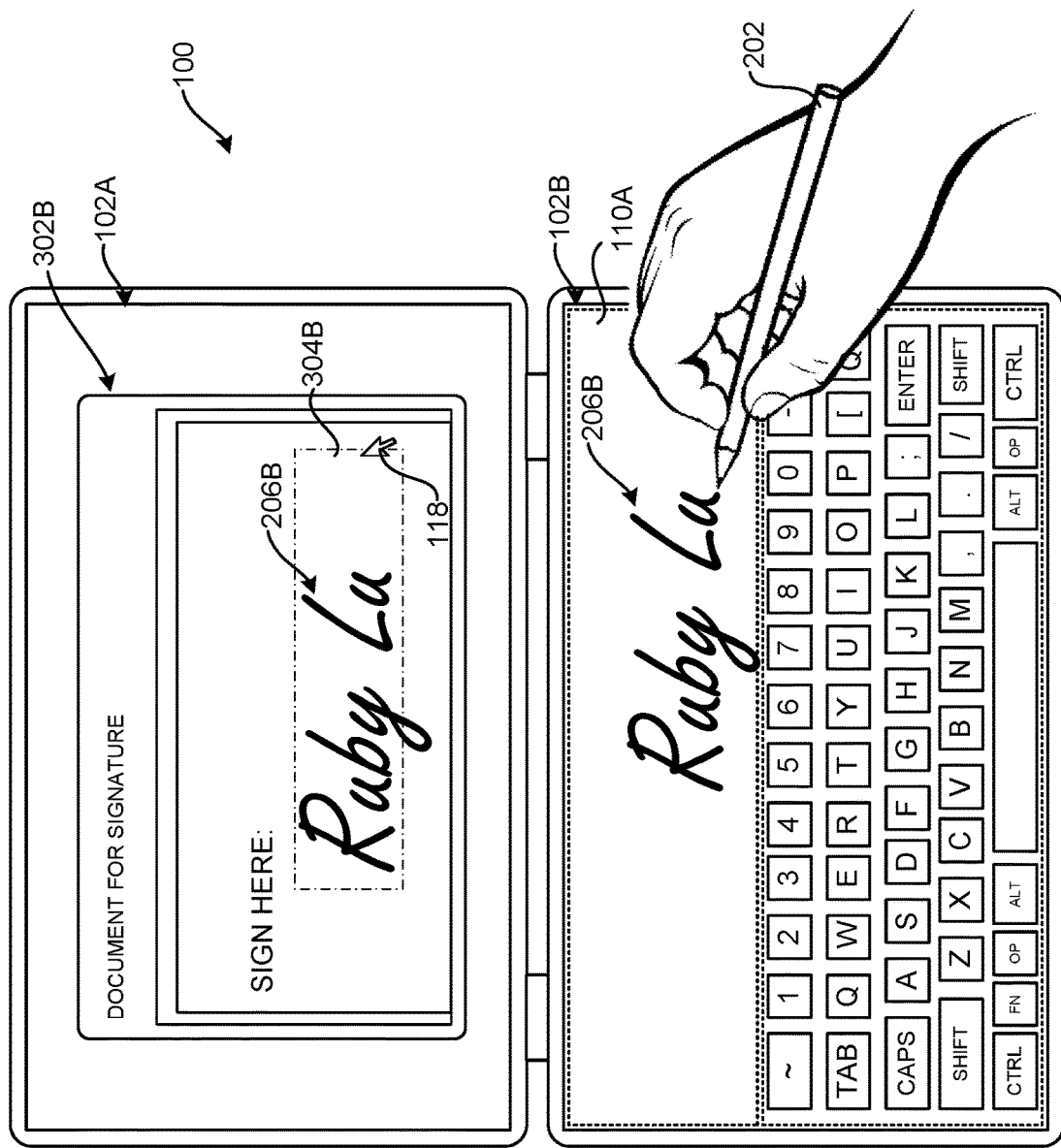
Figure 5:
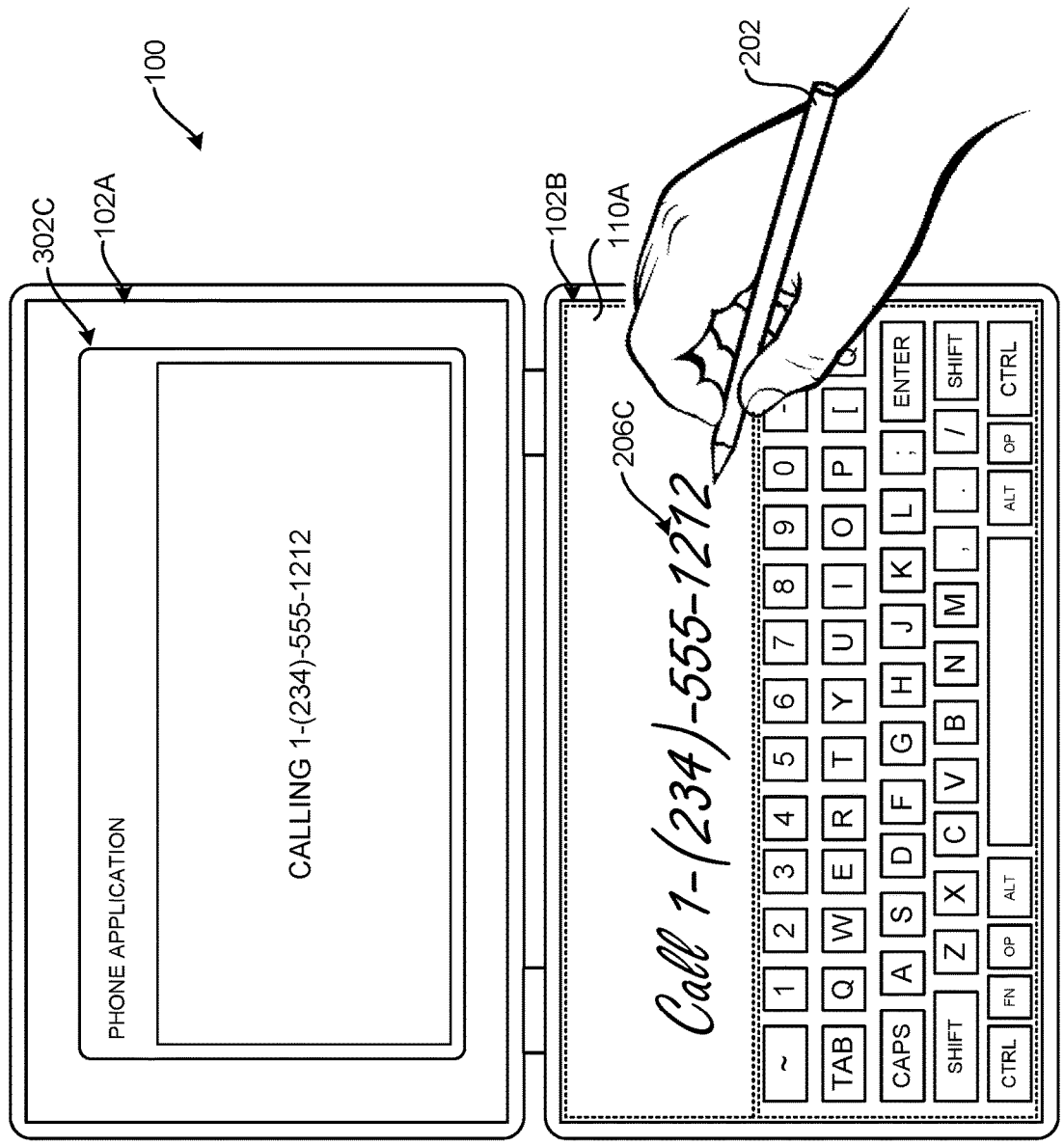

In the configuration illustrated in FIG. 2, a user can utilize a finger 116A, or fingers, to perform gestures, such as the gesture 208, in the virtual trackpad area 110A of the second display region 102B. The illustrative gesture 208 shown in FIG. 2 causes the computing device 100 to move the cursor 118 across the first display region 102A along a path corresponding to the path of the gesture 208. A user can also perform a press or tap operation in the virtual trackpad area 110A with their finger 116A in order to perform an activation operation (e.g. a mouse click) at the location of the cursor 118. Other types of functionality can also be performed in the virtual trackpad area 110A (e.g. a multi-touch gesture, like a two or three finger swipe).

Additionally, a user can write directly in the virtual trackpad area 110A at any time using a digital pen 202. The user does not need to switch modes to utilize the virtual trackpad functionality described above and the digital pen 202 in the virtual trackpad area 110A. In the example shown in FIG. 2, for instance, the user has utilized the digital pen 202 to write the digital ink 206A in the virtual trackpad area 110A without changing input modes.

When input is received within the virtual trackpad area 110A, the computing device 100 determines whether the input is touch input (e.g. input generated by a user's finger 116A) or input generated by a digital pen 202. In order to make such a determination, the digital pen 202 can be communicatively coupled to the computing device 100 through a suitable interface. Through this connection, the computing device 100 can determine if the digital pen 202 has been utilized to write in the virtual trackpad area 110A.

If the input is touch input (e.g. a user's finger 116A), the computing device 100 processes the received input as touch input to the virtual trackpad to move the cursor 118 or perform an activation operation, for example. If the input is received from a digital pen 202, the computing device 100 processes the input as digital ink. In this manner, a user can provide both touch input and input from a digital pen 202 to the virtual trackpad area 110A simultaneously without requiring a user to change from a touch input mode to a digital pen mode.

Processing input received in the virtual trackpad area 110A as digital ink can include, but is not limited to, converting the digital ink to text and providing the text to a program for presentation of the text within a field of a UI presented in the first display region 102A. In the example illustrated in FIG. 3, for instance, a user has utilized the digital pen 202 to write the digital ink 206A (i.e. "Hello, World") in the virtual trackpad area 110A. In response thereto, the computing device 100 has converted the digital ink 206A to text and provided the text to an email application executing on the computing device 100. In turn, the email application has presented the recognized text in a field 304A of a UI window 302A that has been selected using the cursor 118. The recognized text can be provided to other types of programs executing on the computing device 100 or on another local or remote computing device in other configurations.

Processing input received in the virtual trackpad area 110A as digital ink can further include providing the digital ink to a program for presentation of the digital ink within a field of a UI presented in the first display region 102A. In the example illustrated in FIG. 4, for instance, a user has utilized the digital pen 202 to write the digital ink 206A (i.e. "Ruby Lu") in the virtual trackpad area 110A. In response thereto, the computing device 100 has provided the digital ink 206B to a program executing on the computing device 100 that is utilized to sign documents. In turn, the program has presented the digital ink 206B in a field 304B of a UI window 302B that has been selected using the cursor 118. The digital ink 206B can be provided to other types of programs executing on the computing device 100 or on another local or remote computing device in other configurations.

Processing input received in the virtual trackpad area 110A as digital ink can also include, in some configurations, converting the digital ink to text, recognizing a command in the text, and causing the computing device 100 to execute the command. In the example illustrated in FIG. 5, for instance, a user has utilized the digital pen 202 to write the digital ink 206C (i.e. "Call 1-(234)-555-1212") in the virtual trackpad area 110A. In response thereto, the computing device 100 has converted the digital ink 206C to text and provided the text to a communication application (not shown in the FIGS.). In turn, the communication application has presented the recognized command in a UI window 302C and performed the intended command (i.e. calling the specified number). The recognized text can be utilized to perform other types of commands on the computing device 100 or on another local or remote computing device in other configurations.

Processing input received in the virtual trackpad area 110A as digital ink might additionally, or alternative, include the performance of other functions. For example, and without limitation, processing the input as digital ink might include providing the digital ink to a default program for storing notes or digital ink executing on the computing device 100 or another computing system, or converting the digital ink to text and providing the text to a default program for storing notes executing on the computing device 100 or another computing system. The digital ink or text can be provided to such a program responsive to receiving the digital ink without additional input from the user. The computing device 100 can provide the digital ink or text recognized from the digital ink to other types of programs in other configurations.

Figure 6:
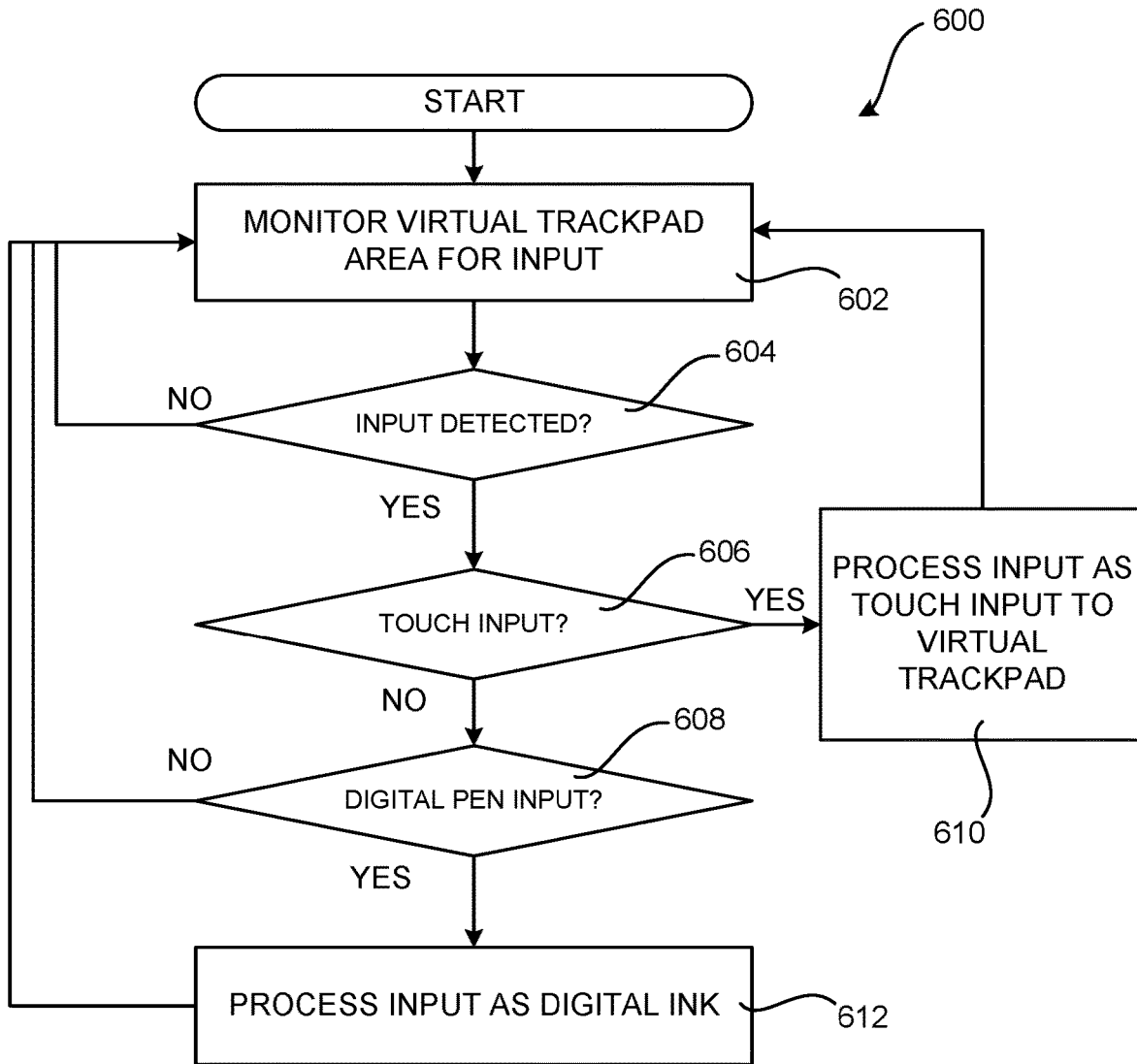
FIG. 6 is a flow diagram showing a routine that illustrates aspects of the operation of the computing device shown in FIG. 1 for modeless digital pen input on a virtual trackpad as shown in FIGS. 2-5.

FIG. 6 is a flow diagram showing a routine 600 that illustrates aspects of the operation of the computing device 100 shown in FIG. 1 for modeless digital pen input on a virtual trackpad as shown in FIGS. 2-5. It should be appreciated that the logical operations described herein with regard to FIG. 5, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 600 begins at operation 602, where the computing device 100 monitors the virtual trackpad area 110A for input. If input is detected in the virtual trackpad area 110A, the routine 600 proceeds from operation 604 to operation 606. At operation 606, the computing device 100 determines if the detected input is touch input (e.g. input made by a user's finger 116A). If so, the routine 600 proceeds from operation 606 to operation 610, where the computing device 100 processes the input as touch input to the virtual trackpad. For example, the computing device 100 might move the cursor 118 or perform an activation operation based on the input. The routine 600 then proceeds from operation 610 back to operation 602.

If the received input is not touch input, the routine 600 proceeds from operation 606 to operation 608, where the computing device 100 determines if the received input is input made by a digital pen 202. If not, the routine 600 proceeds from operation 608 back to operation 602. If the input is digital pen input (i.e. digital ink), then the routine 600 proceeds from operation 608 to operation 612, where the computing device 100 processes the received input as digital ink. For example, the computing device 100 might process the digital ink according to one or more of the examples given above with regard to FIGS. 3-5. The routine 600 then proceeds from operation 612 to operation 602, described above. In this manner, the computing device 100 can process both touch input and pen input made in the virtual trackpad area 110A without requiring user input to change modes.

Modeless Gestures for Summoning User Interfaces

FIGS. 7-12 are schematic diagrams showing aspects of a mechanism disclosed herein for modelessly summoning the display of transient UIs in the virtual trackpad area 110A. In this configuration, the virtual trackpad area 110A can be utilized to initiate the presentation of transient UIs in the virtual trackpad area 110A for performing commands and/or viewing information without requiring a user to change the mode of operation of the virtual trackpad area 110A.

In order to modelessly provide transient UIs in the virtual trackpad area 110A, the computing device 100 determines whether received touch input comprises a touch gesture originating outside an edge of the virtual trackpad area 110A of the second display region 102B and terminating inside the virtual trackpad area 110B. For instance, in the example illustrated in FIG. 7, a user has utilized a finger 116A to perform a swipe gesture 706 that originates outside the left edge of the virtual trackpad area 110A and terminates at a location within the virtual trackpad area 110A (e.g. "an edge swipe" or a multi-finger gesture that does not involve crossing an edge of the virtual trackpad).

Figure 7:
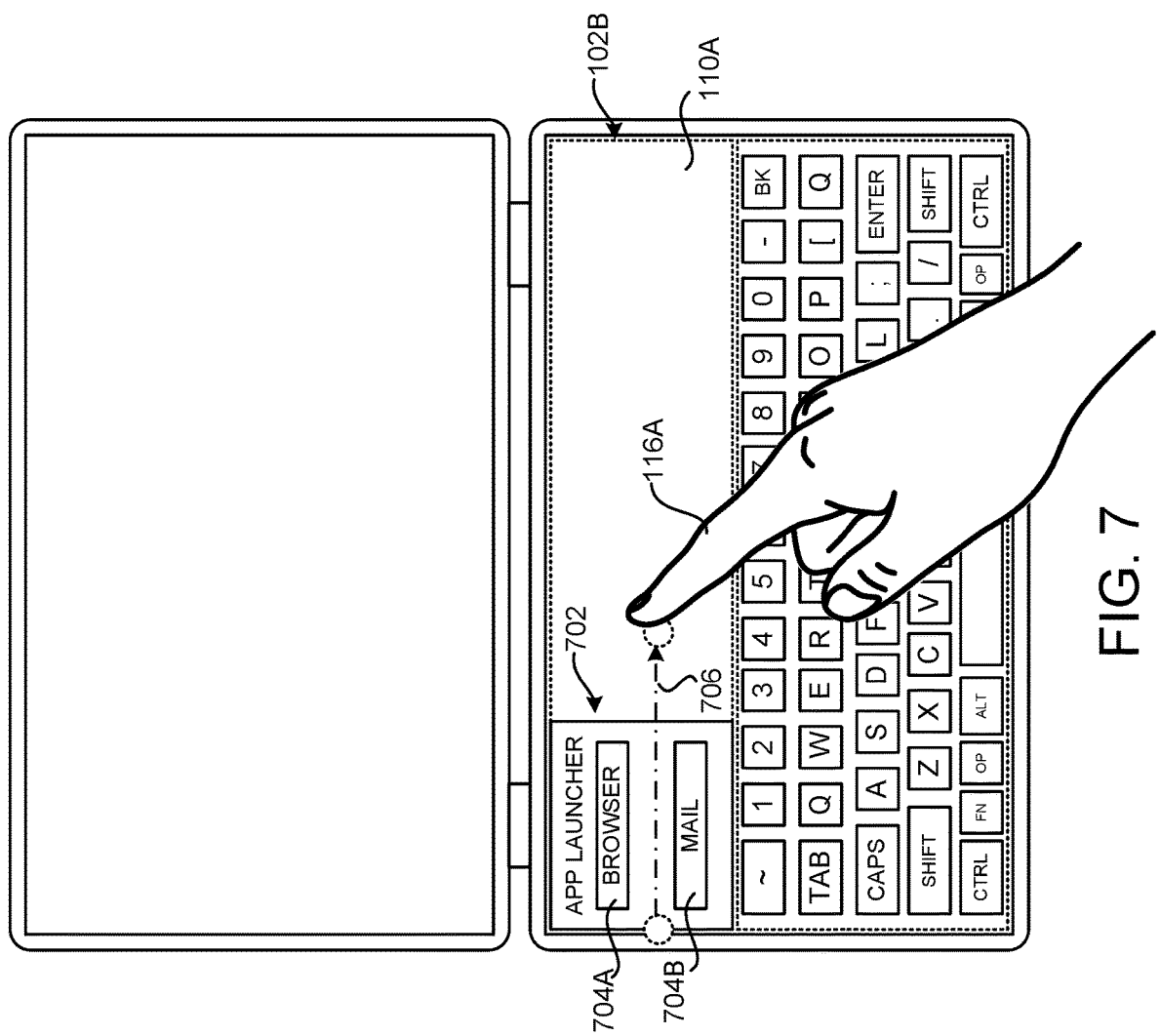
FIGS. 7-11 are schematic diagrams showing aspects of a mechanism disclosed herein for modelessly summoning user interfaces in a virtual trackpad area.

If the computing device 100 detects a touch gesture originating outside an edge of the virtual trackpad area 110A of the second display region 102B and terminating inside the virtual trackpad area 110A, the computing device 100 can display a transient (i.e. temporary) UI in the virtual trackpad area 110A, such as the transient UI 702 shown in FIG. 7. The transient UI might be animated as it is displayed in the second display region 102B such as, for instance, by "sliding" into the virtual trackpad area 110A from the edge of the virtual trackpad area 110A where the gesture originated.

In some configurations, the transient UI presented in the virtual trackpad area 110A includes selectable UI elements, such as UI buttons or other types of UI elements. In the example shown in FIG. 7, for instance, the transient UI 702 includes UI elements 704A and 704B. If the computing device 100 determines that touch input has been made in the virtual trackpad area 110A selecting one of the one or more selectable UI elements, the computing device 100 can initiate a command corresponding to the selected UI element. For instance, a command might be initiated to launch an application that can present a UI in the first display region 102A, switch to an already-launched application (i.e. to switch tasks), or to perform another function.

Figure 8:
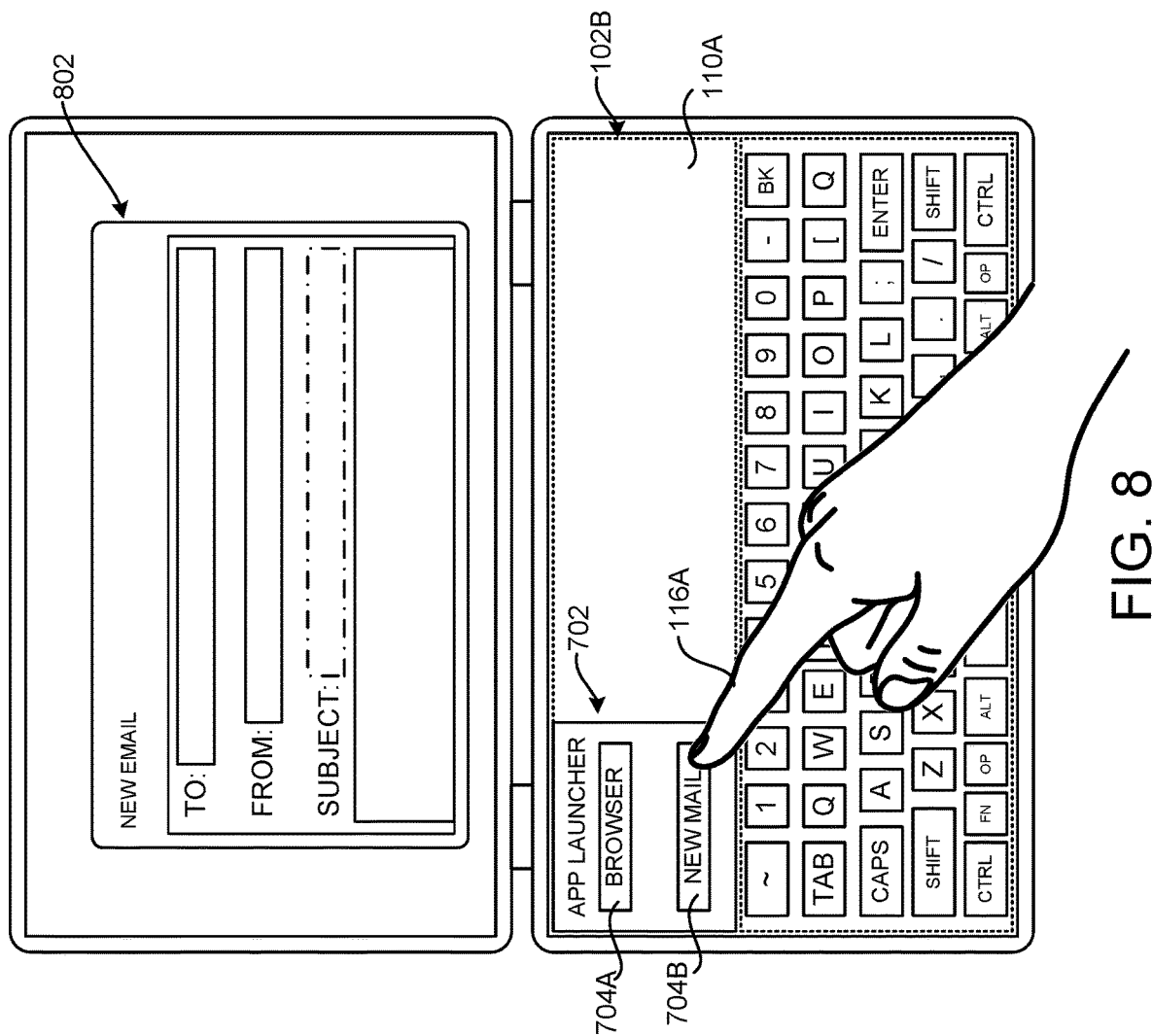

In the example shown in FIG. 7, the UI element 704A corresponds to a web browser application and the UI element 704B corresponds to an email application. As shown in FIG. 8, a user has utilized a finger 116A to select the UI element 704B in this example. In response to detecting the selection of the UI element 704B, the computing device has launched an email application which, in turn, has presented a UI 802 in the first display region 102A. Other types of functions can be performed responsive to the selection of a UI element 704 in a transient UI 702 displayed within the virtual trackpad area 110A.

Figure 9:
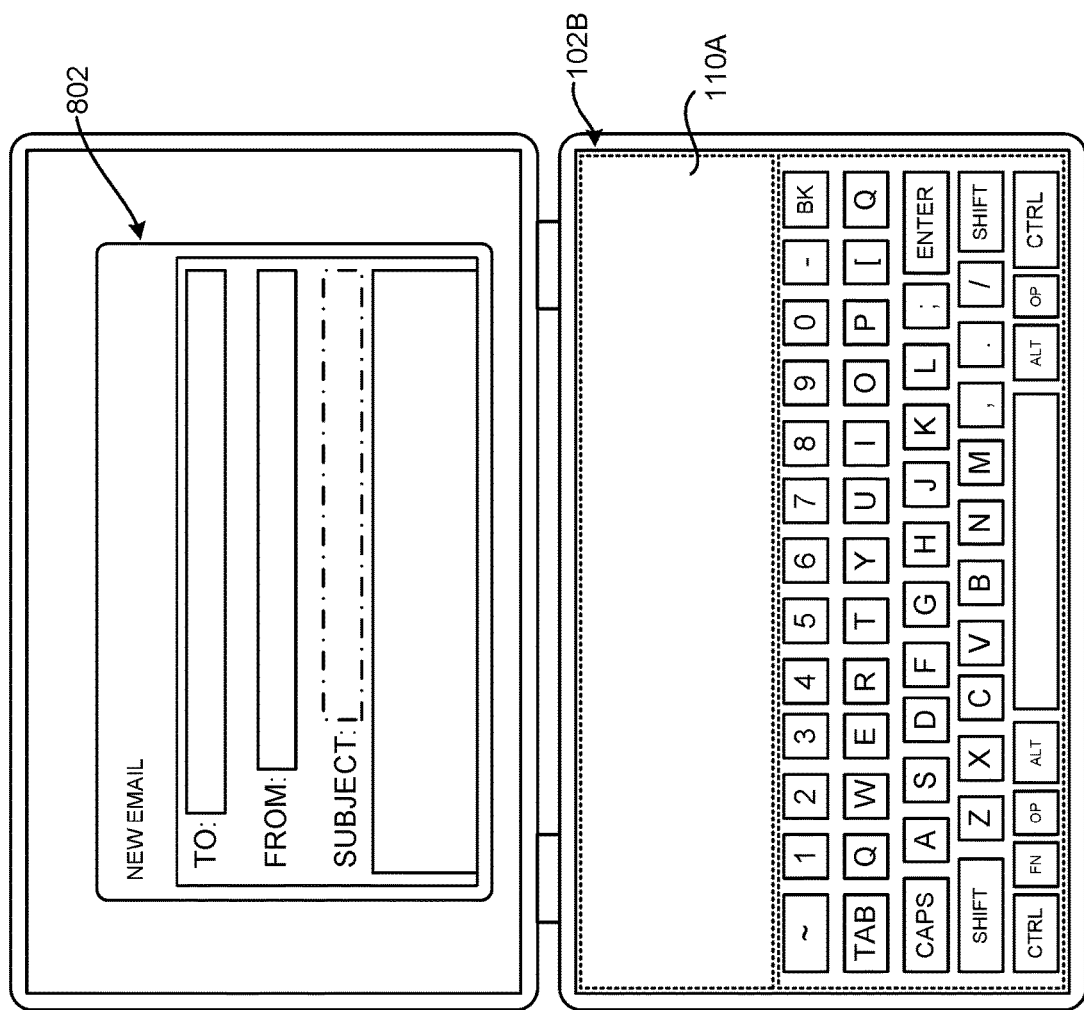
Figure 10:
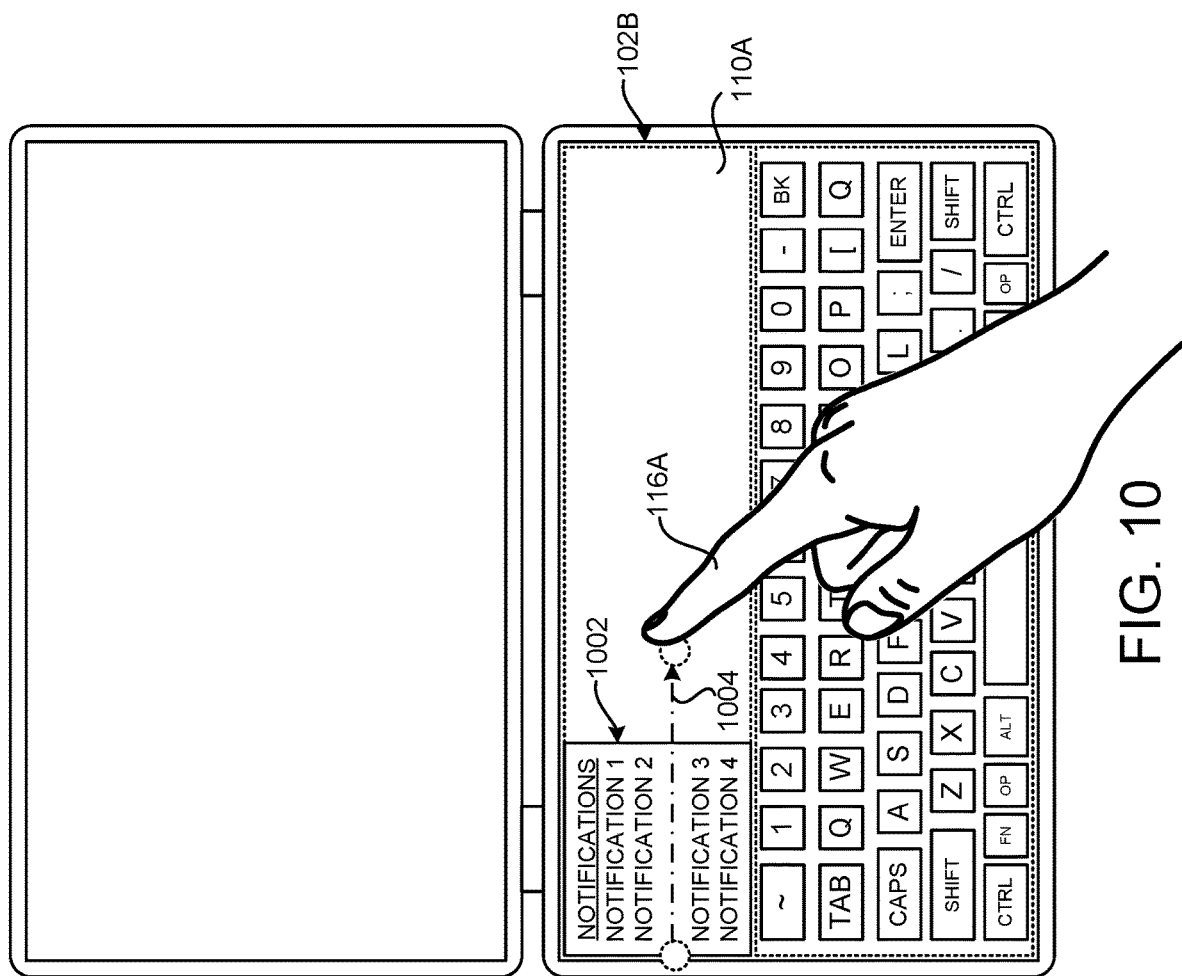

In some configurations, such as that illustrated in FIG. 9, the display of the transient UI 702 is removed from the virtual trackpad area 110A immediately in response to the selection of one of the UI elements. In other configurations, a touch gesture can be utilized to dismiss the transient UI 702. For instance, in the example shown in FIGS. 10 and 11, a user has utilized a finger 116A to perform a swipe gesture 1004 that originates outside the virtual trackpad area 110A and terminates within the virtual trackpad area 110A. As a result, the computing system 100 has presented a transient UI 1002 in the virtual trackpad area 110A that shows notifications.

Figure 11:
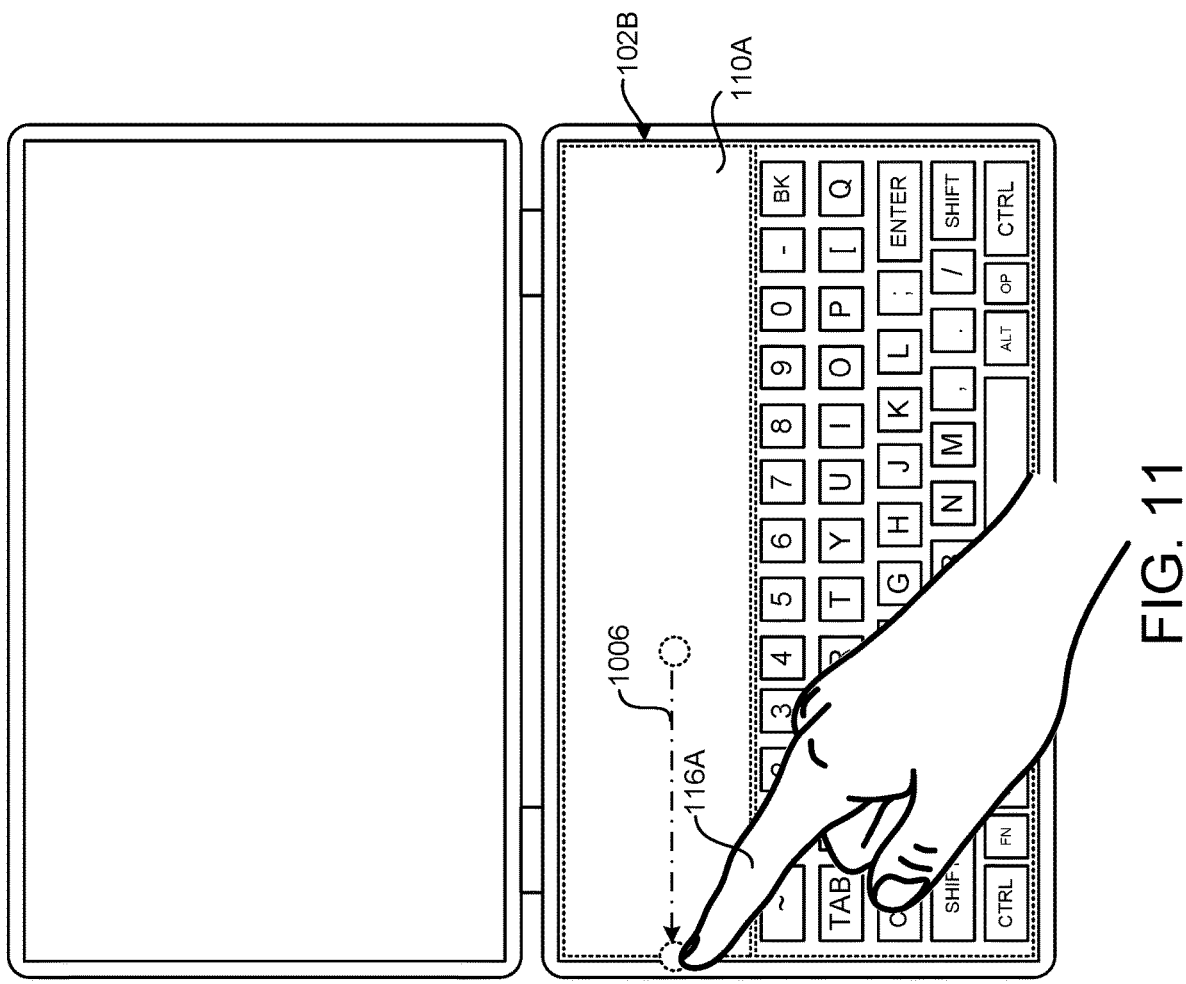

In order to dismiss the transient UI 1002, the user might utilize a finger 116A, or multiple fingers, to perform a gesture for dismissing the transient UI 1002. For example, a user might perform a swipe gesture 1006 from a location inside the virtual trackpad area 110A to a location outside the virtual trackpad area 110A to dismiss the transient UI. This is illustrated in FIG. 11. Other types of gestures, such as a tap gesture outside the transient UI 1002, can also be utilized to dismiss the transient UI 1002.

As when displaying the transient UI in the virtual trackpad area 110A, the display of the transient UI can also be animated as it is removed from the virtual trackpad area 110A such as, for example, by "sliding" the transient UI out of the virtual trackpad area 110A to the edge of the virtual trackpad area 110A where the gesture terminates.

In other configurations, an input gesture made from outside an edge of the virtual trackpad area 110A to a location inside the virtual trackpad area 110A can perform functions based upon the relationship between the ending location of the gesture and UI elements presented in the first display region 102A or in the keyboard area 110B of the second display region 102B. For example, a user might set the audio output volume of the computing device 100 by swiping right from an area outside the virtual trackpad area 110A to a location within the virtual trackpad area 110A. The location at which the gesture ends with respect to a virtual keyboard (e.g. horizontally aligned) shown in the keyboard area 110B specifies the output volume. For instance, if the gesture ends at a location that is spatially aligned with the location of the '1' key on the virtual keyboard, the output volume will be set to one (e.g. 10% of maximum). If the gesture ends at a location that is spatially aligned (e.g. horizontally aligned) with the location of the '9' key on the virtual keyboard, the output volume will be set to nine (e.g. 90% of maximum). In this way, many different specific edge gestures along a common edge of the virtual trackpad area 110A can be disambiguated by a computing system. Such gestures can also be performed with respect to a horizontally-aligned physical keyboard.

Figure 12:
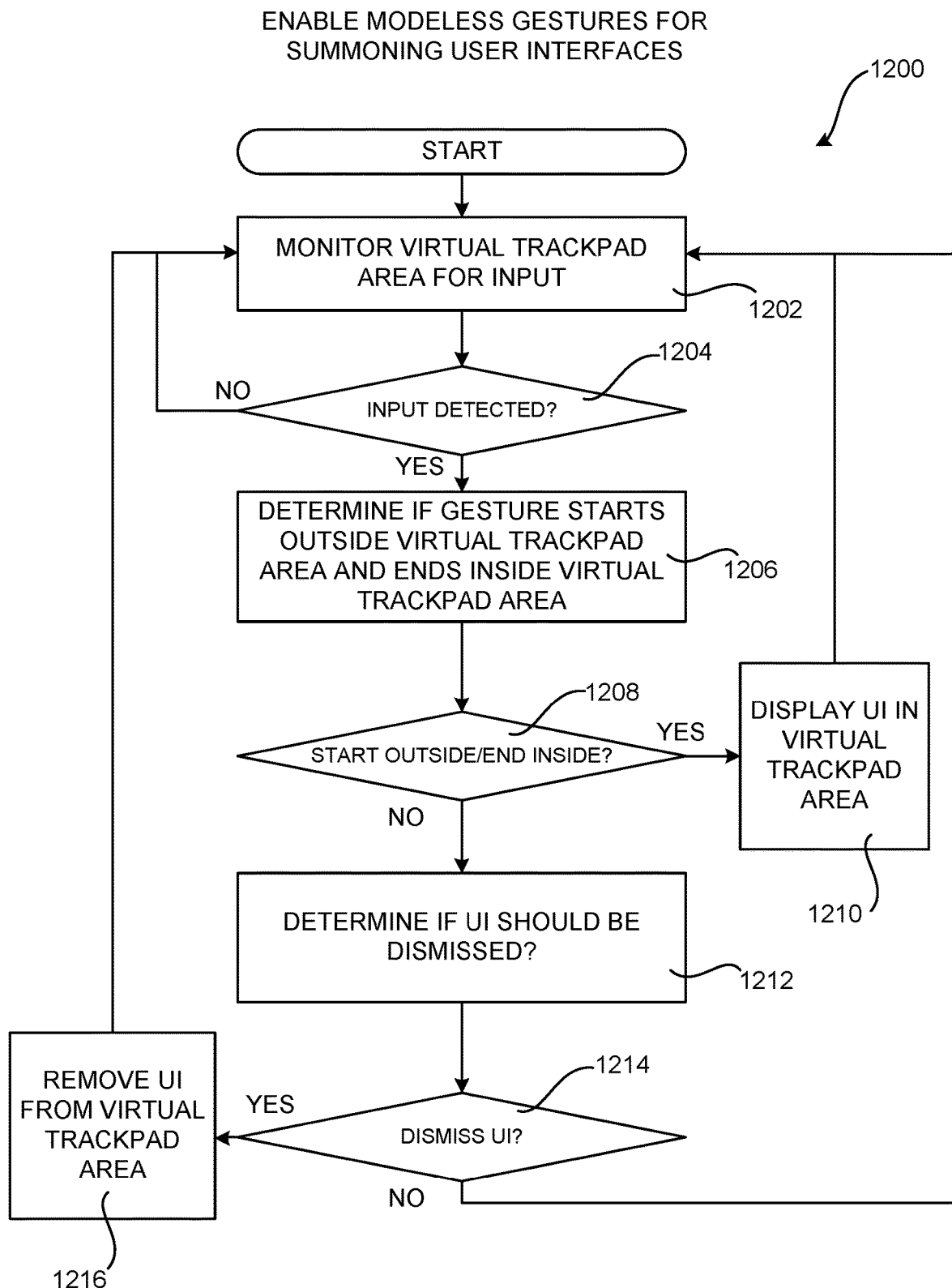
FIG. 12 is a flow diagram showing a routine that illustrates aspects of the operation of the computing device shown in FIG. 1 for modelessly summoning user interfaces in a virtual trackpad area as shown in FIGS. 7-11.

FIG. 12 is a flow diagram showing a routine 1200 that illustrates aspects of the operation of the computing device 100 shown in FIG. 1 for modelessly summoning transient UIs in the virtual trackpad area 110A as described above with reference to FIGS. 7-11. The routine 1200 begins at operation 1202, where the computing device 100 monitors the virtual trackpad area 110A for input. If input is detected in the virtual trackpad area 110A, the routine 1200 proceeds from operation 1204 to operation 1206.

At operation 1206, the computing device 100 determines if the detected input is a touch gesture that started outside the virtual trackpad area 110A and that ended inside the virtual trackpad area 110A. If so, the routine 1200 proceeds from operation 1208 to operation 1210, where the computing device displays a transient UI in the virtual trackpad area 110A. The routine 1200 then continues from operation 1210 back to operation 1202.

If the computing device 100 determines that the received input is not a gesture originating outside the virtual trackpad area 110A and ending inside the virtual trackpad area 110A, the routine 1200 proceeds from operation 1208 to operation 1212. At operation 1212, the computing device 100 determines if the detected input is a touch gesture for dismissing the transient UI, such as a swipe or tap gesture. If so, the routine 1200 proceeds from operation 1212 to operation 1214, where the computing device removes the transient UI from the virtual trackpad area 110A. The routine 1200 then continues from operation 1216 back to operation 1202.

Modeless Gestures Utilizing Relative Position

Figure 13:
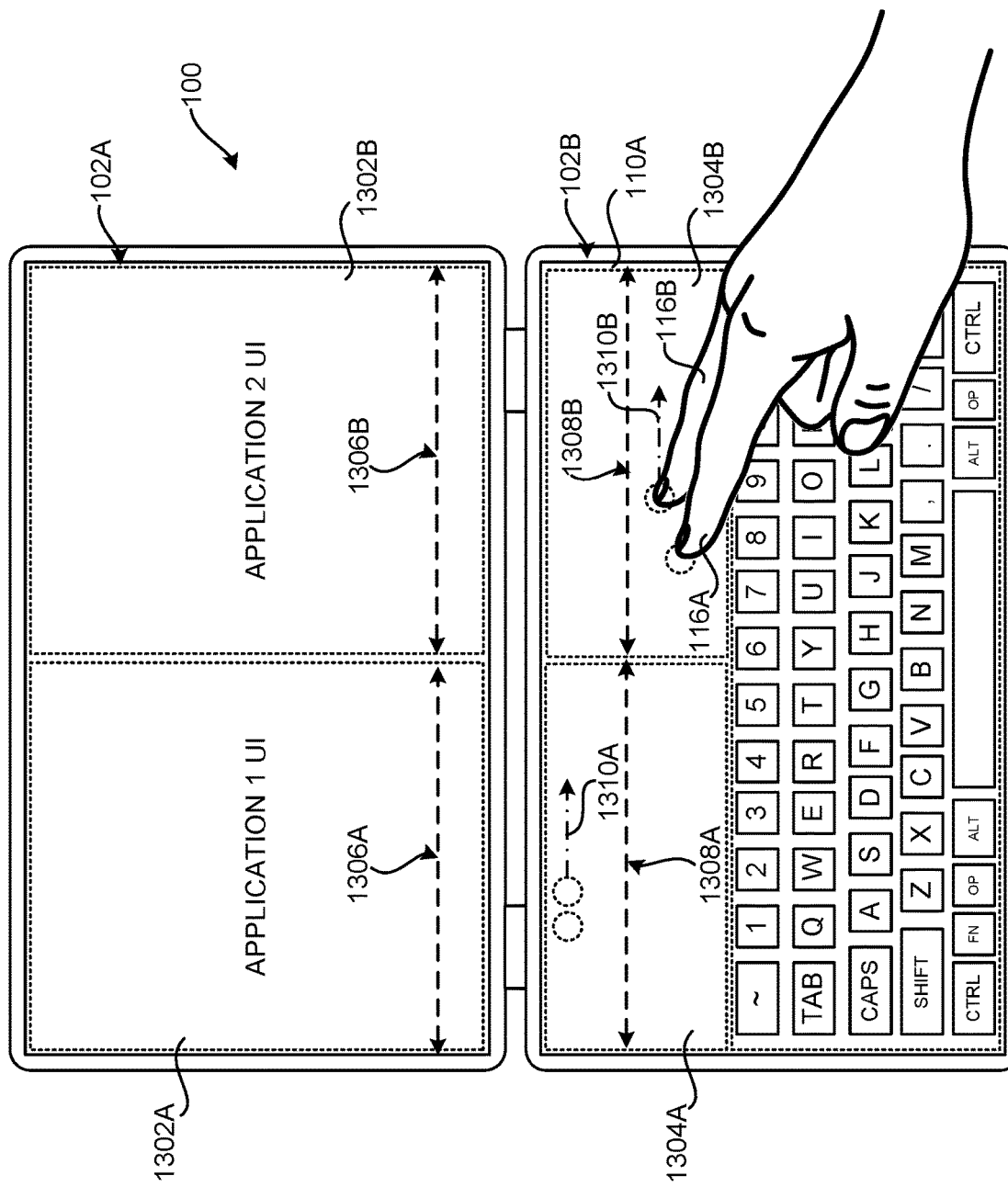
FIGS. 13 and 14 are schematic diagrams showing aspects of a mechanism disclosed herein for enabling modeless gestures on a virtual trackpad that have functionality that is determined based upon the position of the starting point of the gestures relative to on-screen UI or a physical keyboard.
Figure 14:
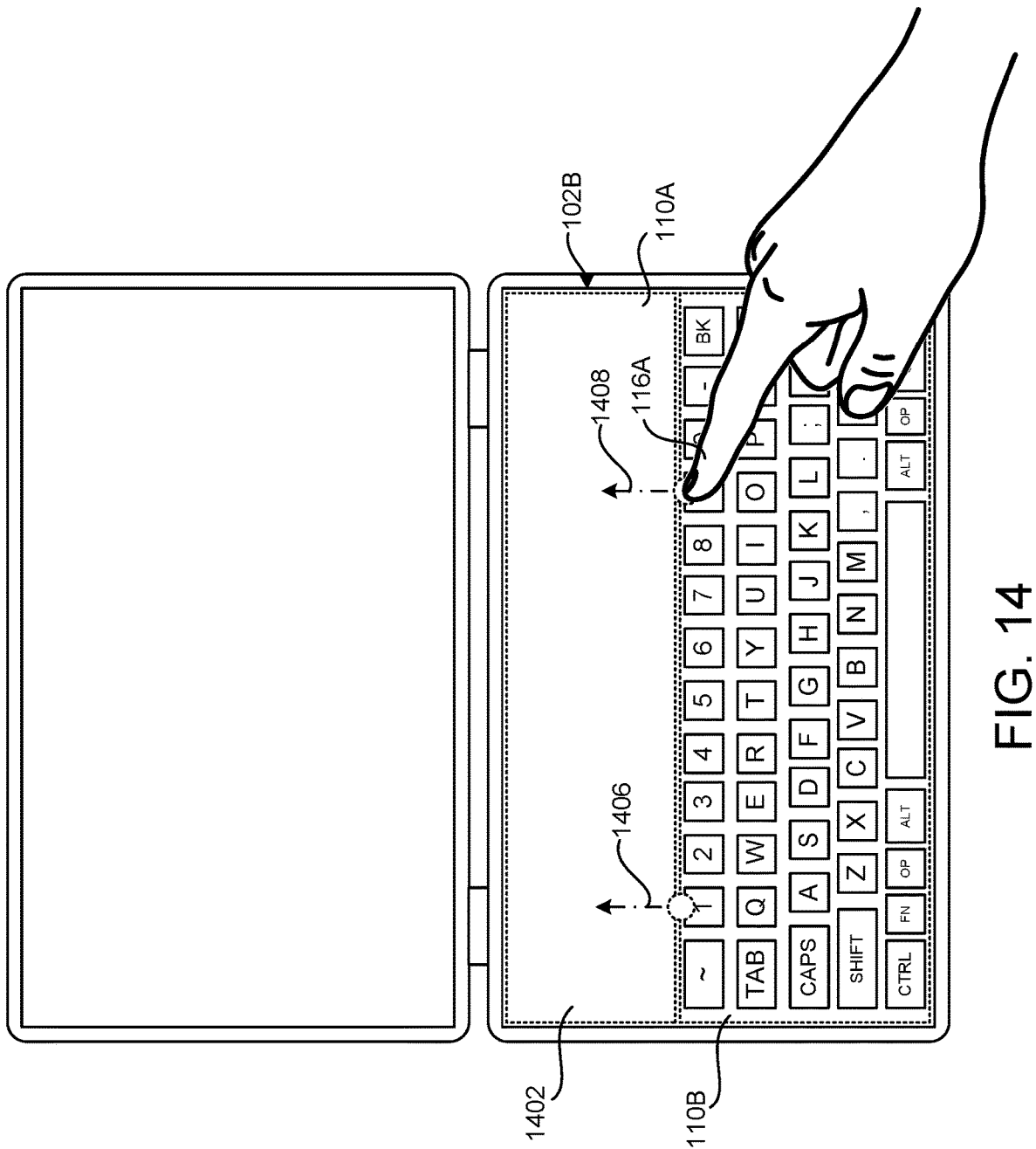

FIGS. 13 and 14 are schematic diagrams showing aspects of a mechanism disclosed herein for enabling modeless gestures on a virtual trackpad that have functionality that is determined based upon the starting point of the gestures relative to adjacent on-screen UI or a physical keyboard. In the example shown in FIG. 13, a first application executing on the computing device 100 presents its UI in a first portion 1302A of the first display region 102A: the left half of the first display region 102A in this configuration.

A first portion 1304A of the virtual trackpad area 110A in the second display region 102B is adjacent to and spatially aligned with the first portion 1302A of the first display region 102A. In the example shown in FIG. 13, for instance, the portion 1302A of the first display region 102A has a width 1306A that is the same as the width 1308A of the portion 1304A of the second display region 102B. In this example, therefore, the first portion 1304A of the virtual trackpad area 110A includes the left half of the second display region 102B, which is spatially aligned with the left half of the first display region 102A (i.e. the portion 1302A), which includes UI generated by a first application.

In the example shown in FIG. 13, a second application executing on the computing device 100 presents its UI in a second portion 1302B of the first display region 102A: the right half of the first display region 102A in this example. A second portion 1304B of the virtual trackpad area 110A is spatially aligned with the second area 1302B of the first display region 102A. In the example shown in FIG. 13, for instance, the portion 1302B of the first display region 102A has a width 1306B that is the same as the width 1308B of the portion 1304B of the second display region 102B. In this example, therefore, the second portion 1304B of the virtual trackpad area 110A includes the right half of the second display region 102B, which is spatially aligned with the right half (i.e. the portion 1302B) of the first display region 102A. In this way, one application is assigned a portion 1302A of the first display region 102A that corresponds to a spatially aligned portion 1304A of the virtual trackpad area 110A in the second display region 102B, and another application is assigned another portion 1302B of the first display region 102A that is spatially aligned with another portion 1304B of the virtual trackpad area 110A.

If the computing device 100 receives input in the first portion 1304A of the virtual trackpad area 110A, the computing device 100 provides the input to the application that is presenting its UI in the adjacent portion 1302A of the first display region 102A. For instance, in the illustrated configuration, if input is received in the left half of the virtual trackpad area 110A (i.e. the portion 1304A), the input will be provided to the application presenting its UI in the left half (i.e. the portion 1302A) of the first display region 102A or processed by an operating system with reference to that application. The input might be, for example, a multi-touch input gesture such as that shown in FIG. 13, or input received from a digital pen. These and other types of inputs can be distinguished from traditional virtual trackpad input for controlling a cursor, for example.

If the computing device 100 receives input in the second portion 1304B of the virtual trackpad area 110A, the computing device 100 provides the received input to the application that is presenting its UI in the adjacent portion of the first display region 102A. For example, if input is received in the right half of the virtual trackpad area 110A (i.e. the portion 1304B), the input will be provided to the application presenting its UI in the right half (i.e. the portion 1302B) of the first display region 102A. In this manner, user input can be provided to different applications executing on the computing device 100 without requiring a user to change the mode of the virtual trackpad area 110A. In this regard, it is to be appreciated that while the example shown in FIG. 13 includes only two applications, input can be modelessly provided to more than two applications in a similar fashion in other configurations. Input might also be provided to two or more regions presented by a single application, such as to an application that features multiple task panes or content regions in its UI.

FIG. 14 illustrates another configuration in which the computing device 100 can detect a user input gesture that originates in an area outside the virtual trackpad area 110A and that terminates within the virtual trackpad area 110A. In the illustrated example, for instance, a vertical swipe gesture using a finger 116A originates from within the keyboard area 110B and terminates within the virtual trackpad area 110A.

Responsive to detecting such a user input gesture, the computing device 100 can perform a command that is selected based, at least in part, upon the location at which the gesture originated. In the illustrated example, for instance, the gesture originates on a key of a virtual keyboard and ends in the virtual trackpad area 110A. In this example, the command to be executed is selected based upon the particular key upon which the gesture originated. For instance, if a gesture originates on the '1' key, the volume of the computing device 100 might be set to 10% of its maximum. If a gesture originates on the '9' key, the volume might be set to 90% of maximum. Other types of commands can be initiated and executed in a similar fashion.

Figure 15:
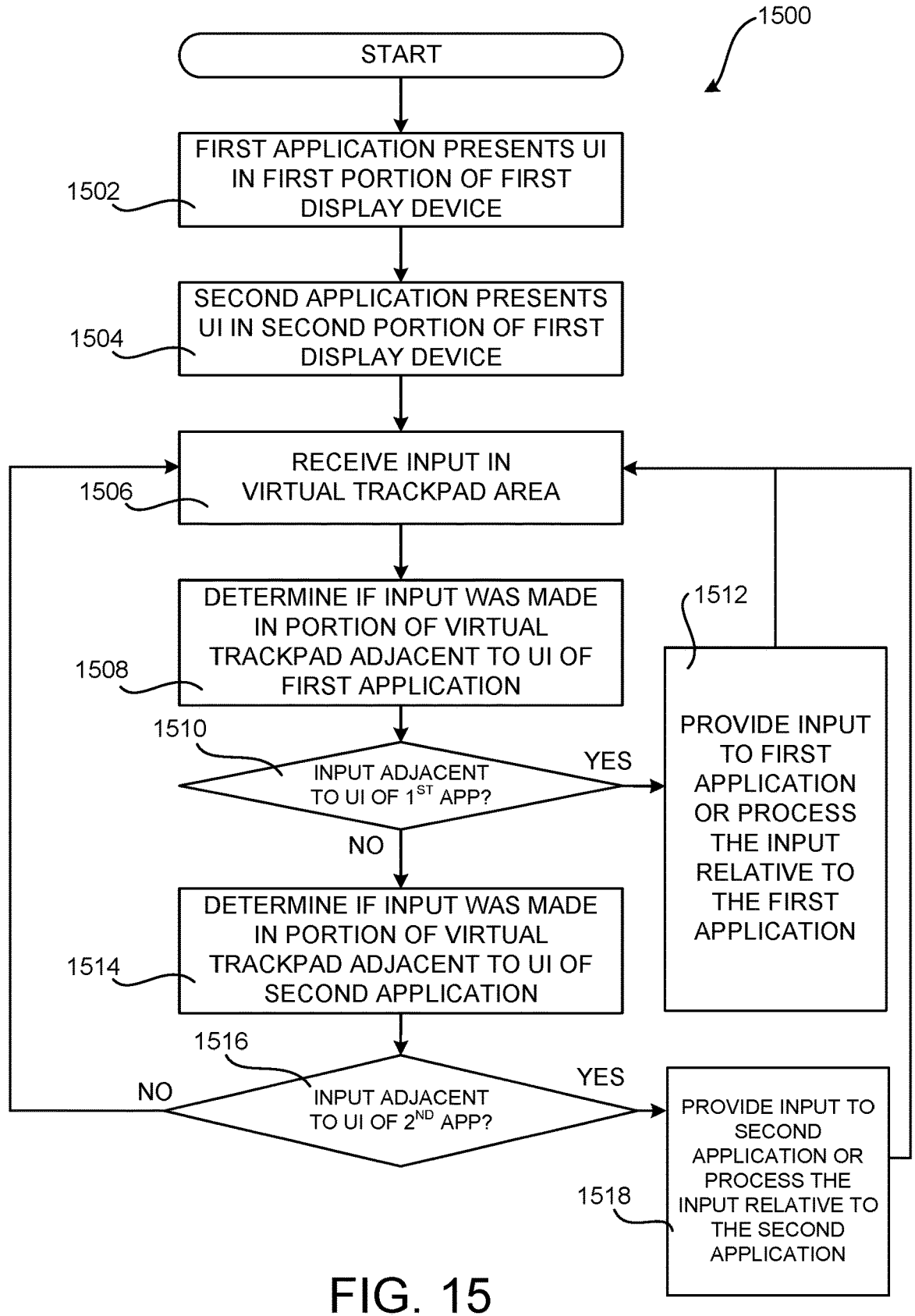
FIG. 15 is a flow diagram showing a routine that illustrates aspects of the operation of the computing device shown in FIG. 1 for enabling modeless gestures on a virtual trackpad that have functionality determined based upon the position of the starting point of the gestures relative to on-screen UI as shown in FIGS. 13 and 14.
Figure 16:
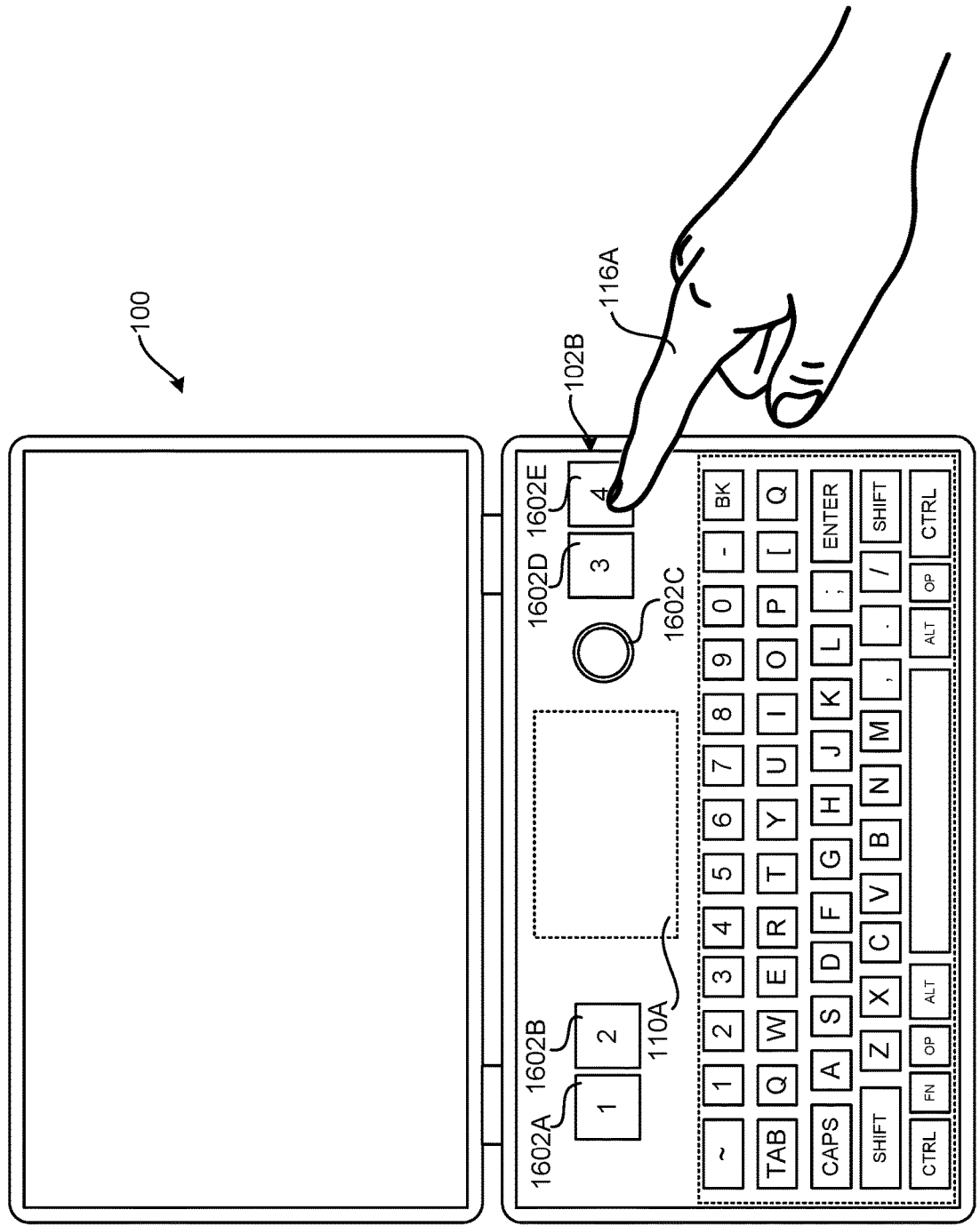
FIGS. 16-19 are schematic diagrams showing aspects of a mechanism disclosed herein for enabling modeless cursor control and interaction with virtual touch targets.

FIG. 15 is a flow diagram showing a routine 1500 that illustrates aspects of the operation of the computing device 100 shown in FIG. 1 for enabling modeless gestures on a virtual trackpad that have functionality determined based upon the position of the starting point of the gestures relative to adjacent on-screen UI as illustrated in FIGS. 13 and 14. The routine 1500 begins at operation 1502, where a first application presents its UI in a first portion of 1306A of the first display region 102A. The routine 1500 then proceeds to operation 1504, where a second application presents its UI in a second portion 1306B of the first display region 102A.

From operation 1504, the routine 1500 proceeds to operation 1506, where the computing device 100 receives input in the virtual trackpad area 110A of the second display region 102B. The routine 1500 then proceeds to operation 1508, where the computing device 100 determines if the input was made in a portion of the virtual trackpad area 110A that is adjacent to the portion 1306A of the first display region 102A containing the UI of the first application. If so, the routine 1500 proceeds from operation 1510 to operation 1512, where the input received at operation 1506 is provided to the first application or processed relative to the first application (e.g. by an operating system). If not, the routine 1500 proceeds from operation 1510 to operation 1514.

At operation 1514, the computing device 100 determines if the input was made in a portion of the virtual trackpad area 110A that is adjacent to the portion 1306B of the first display region 102A containing the UI of the second application. If so, the routine 1500 proceeds from operation 1516 to operation 1518, where the input received at operation 1506 is provided to the second application or processed relative to the second application (e.g. by an operating system). If not, the routine 1500 proceeds from operation 1516 back to operation 1506 where additional input can be received and processed in a similar fashion.

Modeless Cursor Control and Interaction with Virtual Touch Targets

FIGS. 16-19 are schematic diagrams showing aspects of a mechanism disclosed herein for enabling modeless cursor control and interaction with virtual touch targets. In the configuration shown in FIGS. 16-19, areas of a display region that include a virtual trackpad area 110A on a touch-sensitive display 102B can show touch targets (e.g. UI controls) for initiating various types of functionality. In the example shown in FIG. 16, for example, the size of the virtual trackpad area 110A has been reduced and several UI controls 1602A-1602E have been presented in the areas of the second display region 102B around the virtual trackpad area 110A. When selected, such as by using a tap gesture in the second display region 102B, the UI controls 1602A-1602E can initiate various types of functionality such as, for instance, launching a program or summoning a digital assistant on the computing device 100.

Figure 17:
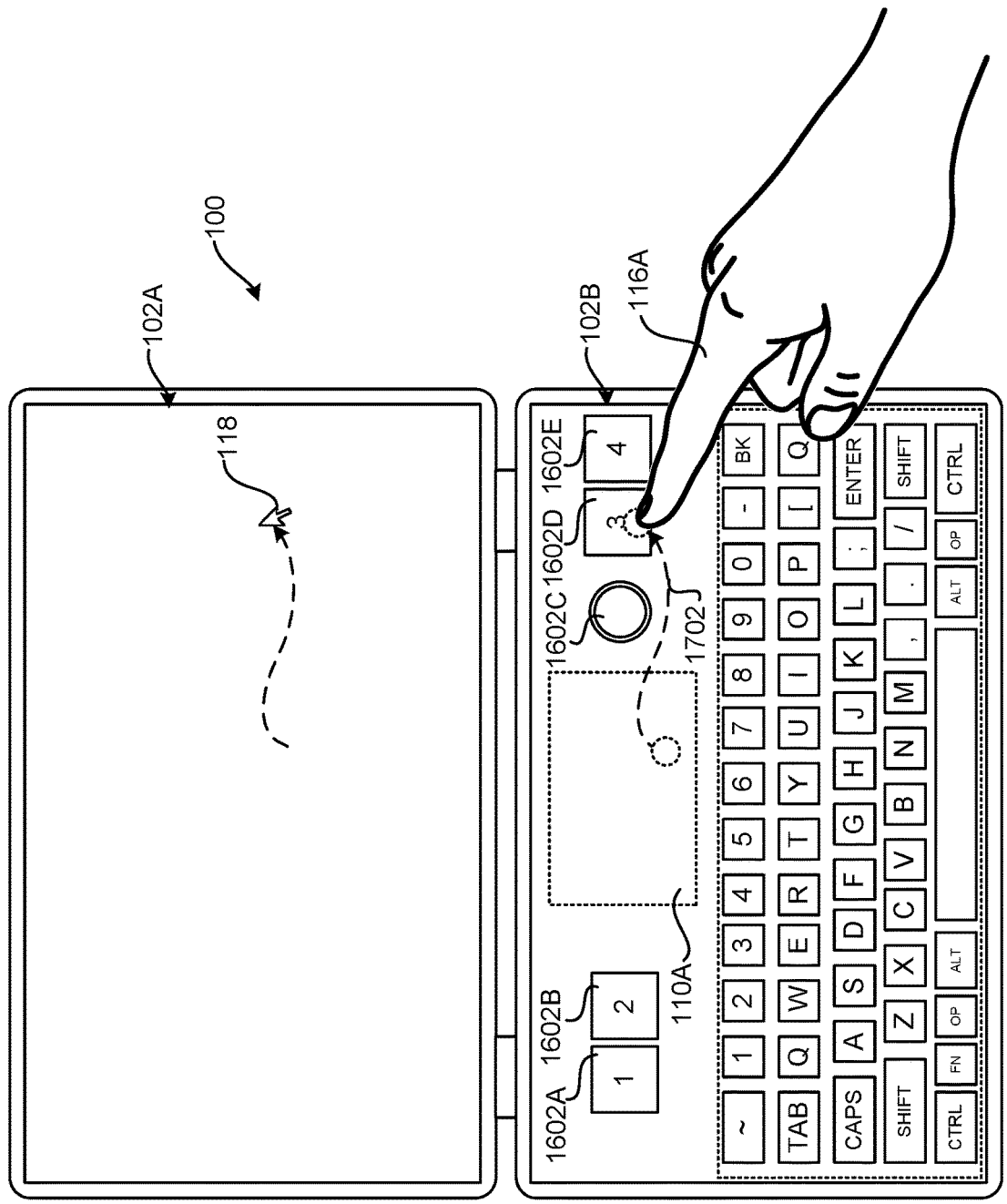

Cursor control can be performed using the virtual trackpad area 110A and the UI controls 1602A-1602E can be selected without changing the mode of the virtual trackpad. For example, and as illustrated in FIG. 17, a touch gesture 1702 for controlling the cursor 118 can originate inside the virtual trackpad area 110A and terminate within one of the UI controls 1602A-1602E without causing selection of the UI control in which the gesture 1702 ends or interrupting cursor control. In this way, if a user's touch gesture inadvertently exits the virtual trackpad area 110A while controlling the cursor 118 and ends in one of the UI controls 1602A-1602E, the UI control will not be selected.

Figure 18:
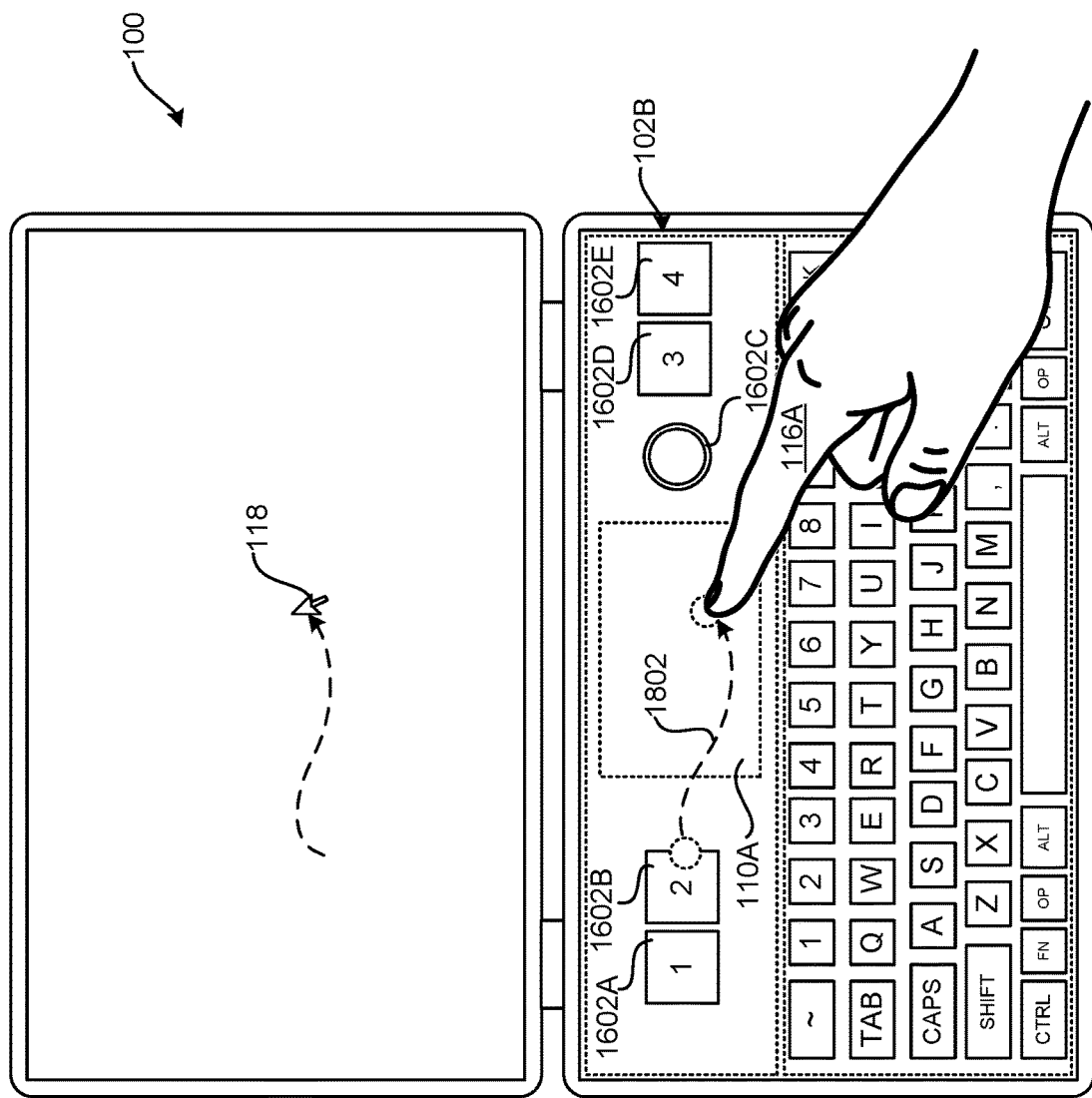

Similarly, and as shown in FIG. 18, a touch gesture 1802 for controlling the cursor 118 can originate in the region that encompasses the virtual trackpad, in the UI control 1602B in this example, and end inside the virtual trackpad area 110A, or another area of the second display region 102B, without causing the selection of the UI control on which the gesture originated. In this way, a cursor control gesture, such as the gesture 1802, can be performed outside of the virtual trackpad area 110A, even if it begins at a UI control 1602. This can be useful, for example, if a user is not looking at the virtual trackpad area 110A when they begin a mouse control gesture.

The starting location and timing of a user input gesture can be used to disambiguate cursor control and interactions with the UI controls without requiring a mode switch, and without interrupting cursor control. For example, if a touch gesture is detected within a UI control 1602, the gesture can be considered a selection of the UI control 1602 if the gesture ends (e.g. a user lifts their finger) within a certain predetermined period of time (e.g. 100 ms). If not, the gesture will be considered the start of a gesture to control the location of the cursor 118.

In some configurations, a previous gesture can be considered when disambiguating a current gesture. For example, and without limitation, a cursor movement followed by a tap gesture that is performed near to the ending location of a preceding cursor movement might be interpreted as a selection, even if the user's finger is now also over a UI control. Generally, a cursor move followed by cursor click at the same location, or cursor move followed by tapping on a UI control somewhere else on the virtual trackpad, can be interpreted as a selection.

In some configurations, the computing device can detect a user input gesture that originates within the virtual trackpad area and that terminates outside the virtual trackpad area. In this example, the computing device can perform a command that is selected based, at least in part, upon the object or location upon which the gesture terminates.

Figure 19:
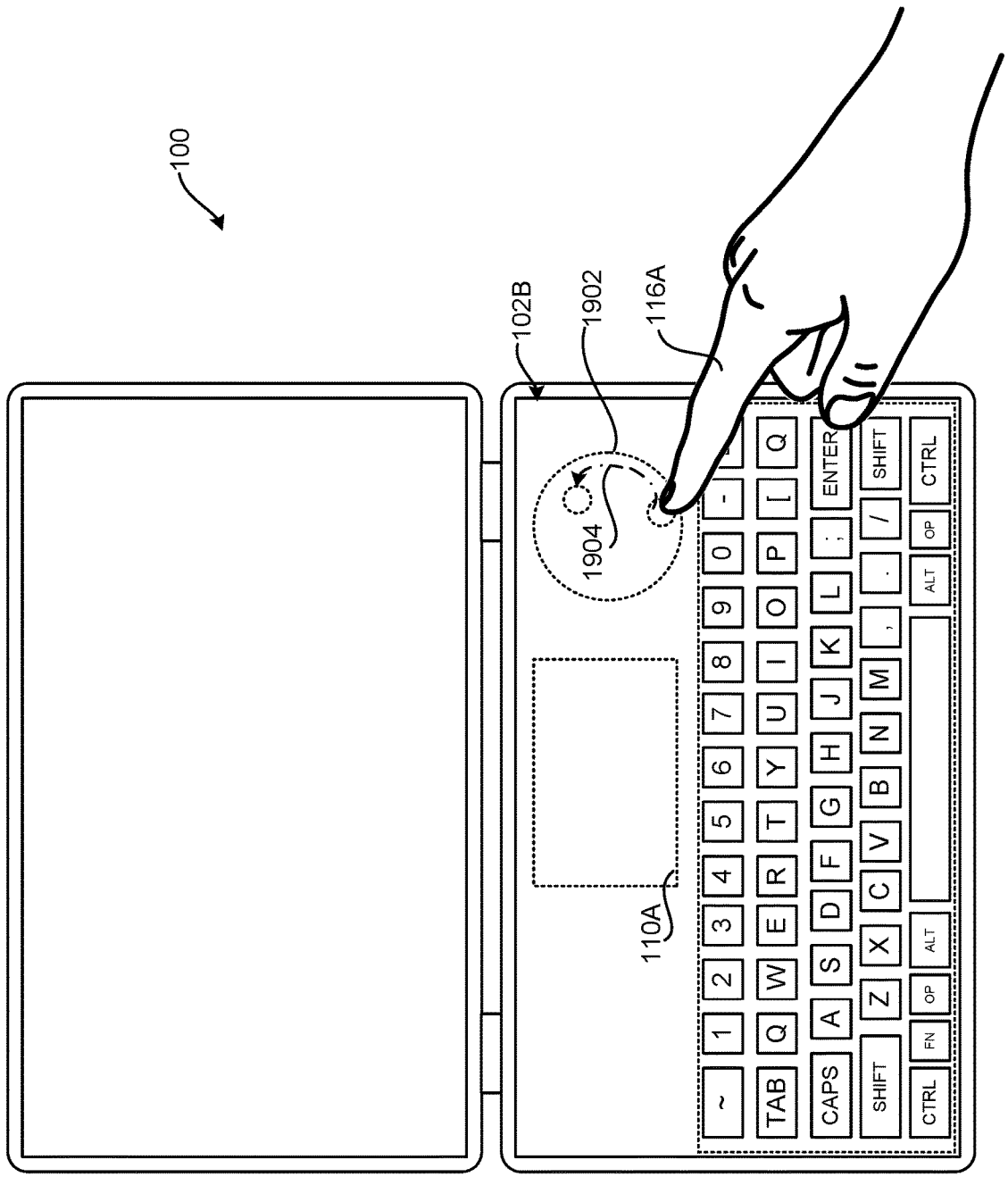

In another configuration, which is illustrated in FIG. 19, physical input objects can be placed on one of several regions of the virtual trackpad area 110A to enable additional functionality such as, but not limited to, providing direct control to volume, brightness, and scrolling of the computing device 100. In the example shown in FIG. 19, for instance, a digital dial 1902 (represented in FIG. 19 as a circular outline of the portion of the digital dial that touches the second display region 102B), has been placed in the second display region 102B. The bottom portion of the digital dial 1902 is made of a suitable material for detection by the second display region 102B. In this example, a user has rotated the digital dial 1902 using a gesture 1904. Responsive to such input, the computing device 100 can adjust settings or perform other types of functionality.

Figure 20:
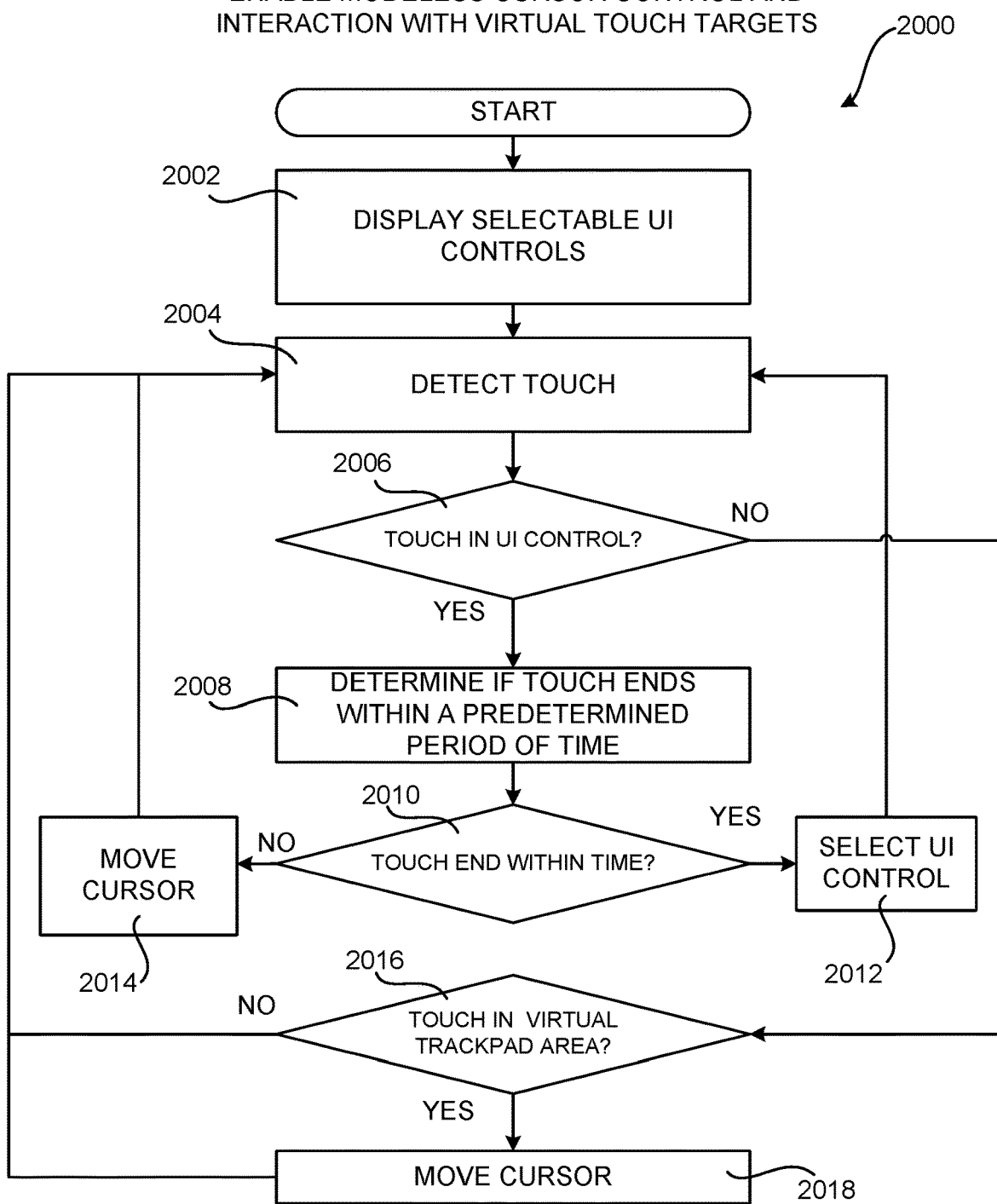
FIG. 20 is a flow diagram showing a routine that illustrates aspects of the operation of the computing device shown in FIG. 1 for modeless cursor control and interaction with virtual touch targets as shown in FIGS. 16-19.

FIG. 20 is a flow diagram showing a routine 2000 that illustrates aspects of the operation of the computing device shown in FIG. 1 for modeless cursor control and interaction with virtual touch targets as shown in FIGS. 16-19. The routine 2000 begins at operation 2002, where one or more selectable UI controls 1602 are displayed outside or inside the virtual trackpad area 110A. The routine 2000 then proceeds to operation 2004, where the computing device 100 detects a touch input in the second display region 102B.

From operation 2004, the routine 2000 proceeds to operation 2006, where the computing device 100 determines if the touch is located within one of the UI controls 1602. If so, the routine 2000 proceeds from operation 2006 to operation 2008, where the computing device 100 determines if the touch ends within a predetermined amount of time (e.g. 100 ms). If the touch has ended within the predetermined amount of time, the computing device 100 considers the UI control in which the touch is located to have been selected at operation 2012. If the touch does not end within the predetermined amount of time, the routine 2000 proceeds from operation 2010 to operation 2014, where the touch gesture is utilized to move the cursor 118.

If, at operation 2006, the computing device 100 determines that the touch detected at operation 2004 was not located in a UI control 1602, the routine 2000 proceeds from operation 2006 to operation 2016. At operation 2016, the computing device 100 determines if the detected touch is located in the virtual trackpad area 110A. if so, the computing device 100 moves the cursor 118 based on the detected gesture. If not, the routine 2000 proceeds back to operation 2004, where additional gestures can be detected and processed in the manner described above.

Figure 21:
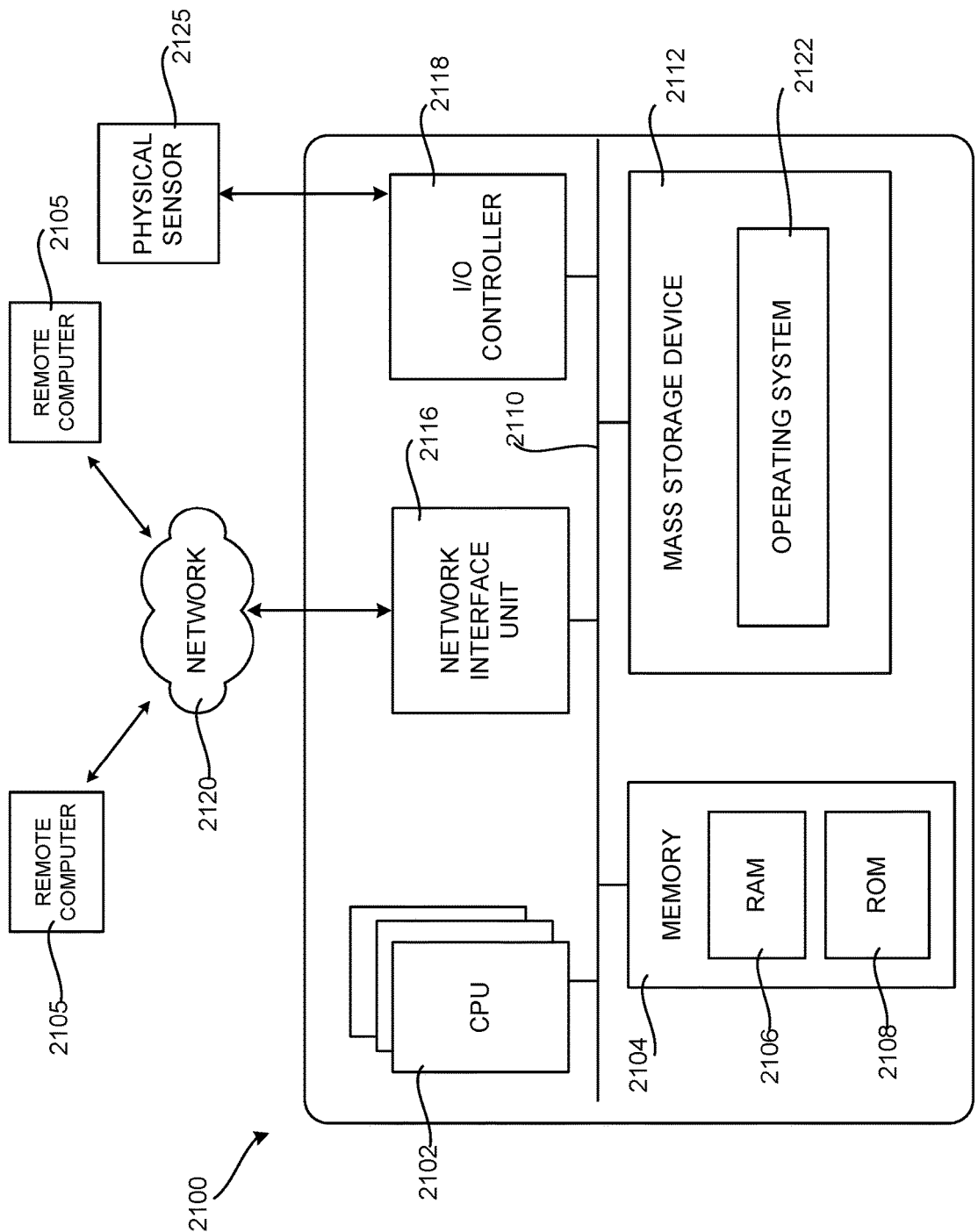
FIG. 21 is a computer architecture diagram showing an illustrative computer hardware and software architecture for a computing device that can implement aspects of the technologies presented herein.

FIG. 21 is a computer architecture diagram showing an illustrative computer hardware and software architecture for a computing device that can implement the various technologies presented herein. In particular, the architecture illustrated in FIG. 21 can be utilized to implement the multiple screen computing device 100 described herein. The illustrated architecture can also be utilized to implement other types of computing systems.

The computer 2100 illustrated in FIG. 21 includes a central processing unit 2102 ("CPU"), a system memory 2104, including a random-access memory 2106 ("RAM") and a read-only memory ("ROM") 2108, and a system bus 2110 that couples the memory 2104 to the CPU 2102. A basic input/output system ("BIOS" or "firmware") containing the basic routines that help to transfer information between elements within the computer 2100, such as during startup, can be stored in the ROM 2108. The computer 2100 further includes a mass storage device 2112 for storing an operating system 2122, application programs, and other types of programs. The functionality described above for augmenting a virtual trackpad is implemented by one or more of these programs in various configurations. The mass storage device 2112 can also be configured to store other types of programs and data.

The mass storage device 2112 is connected to the CPU 2102 through a mass storage controller (not shown) connected to the bus 2110. The mass storage device 2112 and its associated computer readable media provide non-volatile storage for the computer 2100. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 2100.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 2100. For purposes of the claims, the phrase "computer storage medium," and variations thereof, does not include waves or signals per se or communication media.

According to various configurations, the computer 2100 can operate in a networked environment using logical connections to remote computers through a network such as the network 2120. The computer 2100 can connect to the network 2120 through a network interface unit 2116 connected to the bus 2110. It should be appreciated that the network interface unit 2116 can also be utilized to connect to other types of networks and remote computer systems. The computer 2100 can also include an input/output controller 2118 for receiving and processing input from a number of other devices, including a keyboard, mouse, touch input, a digital pen 202, or a physical sensor such as a video camera. Similarly, the input/output controller 2118 can provide output to one or more displays screens, such as the first display region 102A and the second display region 102B.

As discussed above, the first display region 102A and the second display region 102B are output devices configured to present information in a visual form. In particular, the first display region 102A and the second display region 102B can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the first display region 102A and the second display region 102B are liquid crystal displays ("LCD") utilizing any active or passive matrix technology and any backlighting technology (if used). In some configurations, the first display region 102A and the second display region 102B are organic light emitting diode ("OLED") displays. Other display types are contemplated.

As also discussed above, the second display region 102B can be a touch-sensitive display that is configured to detect the presence and location of a touch. Such a display can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen is incorporated on top of a display as a transparent layer to enable a user to use one or more touches to interact with objects or other information presented on the display.

The second display region 102B can be configured to detect multiple touches simultaneously. In some configurations, the second display region 102B is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the second display region 102B. As such, a developer can create gestures that are specific to a particular application program.

In some configurations, the second display region 102B supports a tap gesture in which a user taps the second display region 102B once on an item presented in the second display region 102B. In some configurations, the second display region 102B supports a double tap gesture in which a user taps the second display region 102B twice on an item presented in the second display region 102B. The double tap gesture can be used for various reasons including, but not limited to, zooming in or zooming out in stages. In some configurations, the second display region 102B supports a tap and hold gesture in which a user taps the second display region 102B and maintains contact for at least a pre-defined time. The tap and hold gesture can be used for various reasons including, but not limited to, opening a context-specific menu.

In some configurations, the second display region 102B supports a pan gesture in which a user places a finger in the second display region 102B and maintains contact with the second display region 102B while moving the finger in the second display region 102B. The pan gesture can be used for various reasons including, but not limited to, moving through screens, images, or menus at a controlled rate. Multiple finger pan gestures are also contemplated.

In some configurations, the second display region 102B supports a flick gesture in which a user swipes a finger in the direction the user wants the screen to move. The flick gesture can be used for various reasons including, but not limited to, scrolling horizontally or vertically through menus or pages. In some configurations, the second display region 102B supports a pinch and stretch gesture in which a user makes a pinching motion with two fingers (e.g., thumb and forefinger) in the second display region 102B or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as digital pens can be used to interact with the second display region 102B. As such, the above gestures should be understood as being illustrative and should not be construed as being limiting in any way.

It should be appreciated that the software components described herein, when loaded into the CPU 2102 and executed, can transform the CPU 2102 and the overall computer 2100 from a general-purpose computing device into a special-purpose computing device customized to facilitate the functionality presented herein. The CPU 2102 can be constructed from any number of transistors or other discrete circuit elements, which can individually or collectively assume any number of states. More specifically, the CPU 2102 can operate as a finite-state machine, in response to executable instructions contained within the software modules disclosed herein. These computer-executable instructions can transform the CPU 2102 by specifying how the CPU 2102 transitions between states, thereby transforming the transistors or other discrete hardware elements constituting the CPU 2102.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 2100 in order to store and execute the software components presented herein. It also should be appreciated that the architecture shown in FIG. 21 for the computer 2100, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 2100 might not include all of the components shown in FIG. 21, can include other components that are not explicitly shown in FIG. 21, or can utilize an architecture completely different than that shown in FIG. 21.

It should be appreciated that the computing architecture shown in FIG. 21 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Clause 1. A computing device, comprising: a processor; a first display device providing a first display region having an edge; a touch-sensitive display device providing a second display region having an edge parallel with and adjacent to the edge of the first display region; and a memory storing instructions executable by the processor to: execute a first application configured to present a user interface (UI) in a first portion of the first display region, the first portion of the first display region being spatially aligned with a first portion of the second display region; execute a second application configured to present a UI in a second portion of the first display region, the second portion of the first display region being spatially aligned with a second portion of the second display region; responsive to receiving first input in the first portion of the second display region, process the first input by way of an operating system in a context of the first application or provide the first input to the first application; and responsive to receiving second input in the second portion of the second display region, process the second input by way of an operating system in a context of the second application or provide the second input to the second application.

Clause 2. The computing device of clause 1, wherein the first input or second input comprise a multi-touch gesture.

Clause 3. The computing device of any of clauses 1-2, wherein the first input or second input comprise user input received from a digital pen.

Clause 4. The computing device of any of clauses 1-3, wherein the memory stores further instructions executable by the processor to: detect a user input gesture originating at a location in a third portion of the second display region and terminating in the first portion of the second display region or the second portion of the second display region; and responsive to detecting the user input gesture, perform a command, the command selected based, at least in part, upon the location in the third portion at which the user input gesture originated.

Clause 5. The computing device of any of clauses 1-4, wherein third portion displays a keyboard having a plurality of keys, and wherein the gesture originates at one of the plurality of keys.

Clause 6. The computing device of any of clauses 1-5, wherein the first portion of the first display region and the first portion of the second display region have a same width.

Clause 7. The computing device of claim 1-6, wherein the second portion of the first display region and the second portion of the second display region have a same width.

Clause 8. A computer-implemented method, comprising: executing a first application configured to present a user interface (UI) in a first portion of a first display region, the first portion of the first display region being spatially aligned with a first portion of a second display region; executing a second application configured to present a UI in a second portion of the first display region, the second portion of the first display region being spatially aligned with a second portion of the second display region; responsive to receiving first input in the first portion of the second display region, processing the first input in a context of the first application or providing the first input to the first application; and responsive to receiving second input in the second portion of the second display region, processing the second input in a context of the second application or providing the second input to the second application.

Clause 9. The computer-implemented method of clause 8, wherein the first input or second input comprise a multi-touch gesture.

Clause 10. The computer-implemented method of any of clauses 8-9, wherein the first input or second input comprise user input received from a digital pen.

Clause 11. The computer-implemented method of any of clauses 8-10, further comprising: detecting a user input gesture originating at a location in a third portion of the second display region and terminating in the first portion of the second display region or the second portion of the second display region; and responsive to detecting the user input gesture, performing a command, the command selected based, at least in part, upon the location in the third portion at which the user input gesture originated.

Clause 12. The computer-implemented method of any of clauses 8-11, wherein third portion displays a keyboard having a plurality of keys, and wherein the gesture originates at one of the plurality of keys.

Clause 13. The computer-implemented method of any of clauses 8-12, wherein the first portion of the first display region and the first portion of the second display region have a same width.

Clause 14. The computer-implemented method of any of clauses 8-13, wherein the second portion of the first display region and the second portion of the second display region have a same width.

Clause 15. A computer-readable storage medium having computer-executable instructions stored thereupon which, when executed by a computer, cause the computer to: execute a first application configured to present a user interface (UI) in a first portion of a first display region, the first portion of the first display region being spatially aligned with a first portion of a second display region; and responsive to receiving first input in the first portion of the second display region, process the first input in a context of the first application or provide the first input to the first application.

Clause 16. The computer-readable storage medium of clause 15, having further computer-executable instructions stored thereupon to: execute a second application configured to present a UI in a second portion of the first display region, the second portion of the first display region being spatially aligned with a second portion of the second display region; and responsive to receiving second input in the second portion of the second display region, process the second input in a context of the second application or provide the second input to the second application.

Clause 17. The computer-readable storage medium of any of clauses 15-16, wherein the first input or second input comprise a multi-touch gesture.

Clause 18. The computer-readable storage medium of any of clauses 16-17, wherein the first input or second input comprise user input received from a digital pen.

Clause 19. The computer-readable storage medium of any of clauses 16-18, having further computer-executable instructions stored thereupon to: detect a user input gesture originating at a location in a third portion of the second display region and terminating in the first portion of the second display region or the second portion of the second display region; and responsive to detecting the user input gesture, perform a command, the command selected based, at least in part, upon the location in the third portion at which the user input gesture originated.

Clause 20. The computer-readable storage medium of any of clauses 16-19, wherein the first portion of the first display region and the first portion of the second display region have a first width and wherein the second portion of the first display region and the second portion of the second display region have a second width.

Based on the foregoing, it should be appreciated that technologies for modelessly augmenting the functionality provided by virtual trackpads have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computing device, comprising:
   a processor;
   a first display device providing a first display region having an edge;
   a touch-sensitive display device providing a second display region having an edge parallel with and adjacent to the edge of the first display region, wherein the touch-sensitive display device is physically attached to maintain physical alignment between the first display region and the second display region; and a memory storing instructions executable by the processor to:

execute a first application configured to present a graphical user interface (GUI) in a first portion of the first display region, the first portion of the first display region being physically aligned with a first virtual trackpad portion of the second display region;

execute a second application configured to present a GUI in a second portion of the first display region concurrently with the presentation of the GUI of the first application in the first portion of the first display region, the second portion of the first display region being physically aligned with a second virtual trackpad portion of the second display region;

based on receiving first input in the first virtual trackpad portion of the second display region, process the first input by way of an operating system in a context of the first application or provide the first input to the first application; and based on receiving second input in the second virtual trackpad portion of the second display region, process the second input by way of the operating system in a context of the second application or provide the second input to the second application.

2. The computing device of claim 1, wherein the first input or second input comprise a multi-touch gesture.

3. The computing device of claim 1, wherein the first input or second input comprise user input received from a digital pen.

4. The computing device of claim 1, wherein the memory stores further instructions executable by the processor to:

detect a user input gesture originating at a location in a third portion of the second display region and terminating in the first virtual trackpad portion of the second display region or the second virtual trackpad portion of the second display region; and responsive to detecting the user input gesture, perform a command, the command selected based, at least in part, upon the location in the third portion at which the user input gesture originated.

5. The computing device of claim 4, wherein third portion displays a keyboard having a plurality of keys, and wherein the gesture originates at one of the plurality of keys.

6. The computing device of claim 1, wherein the first virtual trackpad portion of the second display region defines a first input region that is configured to only provide input to the first application, and wherein the second virtual trackpad portion of the second display region defines a second input region that is configured to only provide input to the second application.

7. The computing device of claim 1, wherein the first virtual trackpad portion of the second display region does not overlap with the second virtual trackpad portion of the second display region.

8. The computing device of claim 1, wherein the first portion of the first display region does not overlap with the second portion of the first display region.

9. The computing device of claim 1, wherein a width of the first portion of the first display region corresponds with a width of the first virtual trackpad portion of the second display region.

10. The computing device of claim 1, wherein a width of the second portion of the first display region is based on a width of the second virtual trackpad portion of the second display region.

11. The computing device of claim 1, wherein the first display device and the touch-sensitive display are mechanically attached by a hinge.

12. A computer-implemented method, comprising:

executing a first application configured to present a graphical user interface (GUI) in a first portion of a first display region of a first display device, the first portion of the first display region being spatially aligned with a first virtual trackpad portion of a second display region of a touch-sensitive display, wherein the first display device and the touch-sensitive display are physically attached to maintain a physical alignment between the first portion of the first display region and the first virtual trackpad portion of the second display region;

executing a second application configured to present a GUI in a second portion of the first display region concurrently with the presentation of the GUI of the first application in the first portion of the first display region, the second portion of the first display region being physically aligned with a second virtual trackpad portion of the second display region, wherein the first display device and the touch-sensitive display are physically attached to maintain a physical alignment between the second portion of the first display region and the second virtual trackpad portion of the second display region;

responsive to receiving first input in the first virtual trackpad portion of the second display region, processing the first input in a context of the first application or providing the first input to the first application; and responsive to receiving second input in the second virtual trackpad portion of the second display region, processing the second input in a context of the second application or providing the second input to the second application.

13. The computer-implemented method of claim 12, wherein the first input or second input comprise a multi-touch gesture.

14. The computer-implemented method of claim 12, further comprising:

detecting a user input gesture originating at a location in a third portion of the second display region and terminating in the first virtual trackpad portion of the second display region or the second virtual trackpad portion of the second display region; and responsive to detecting the user input gesture, performing a command, the command selected based, at least in part, upon the location in the third portion at which the user input gesture originated.

15. The computer-implemented method of claim 12, wherein the first portion of the first display region and the first virtual trackpad portion of the second display region have a same width.

16. The computer-implemented method of claim 12, wherein the second portion of the first display region and the second virtual trackpad portion of the second display region have a same width.

17. A computer-readable storage medium having computer-executable instructions stored thereupon which, when executed by a computer, cause the computer to:

execute a first application configured to present a graphical user interface (GUI) in a first portion of a first display region, the first portion of the first display region being physically aligned with a first virtual trackpad portion of a second display region positioned concurrently with a second virtual trackpad portion of the second display region, wherein the GUI of the first application displayed in the first portion of the first display region is concurrently displayed with a GUI displayed in a second portion of the first display region, wherein a first display device comprising the first display region and a touch-sensitive display comprising the second display region are physically attached to maintain a physical alignment between the second portion of the first display region and the second virtual trackpad portion of the second display region; and responsive to receiving first input in the first virtual trackpad portion of the second display region, process the first input in a context of the first application or provide the first input to the first application.

18. The computer-readable storage medium of claim 17, having further computer-executable instructions stored thereupon to:

execute a second application configured to be presented in the UI displayed in the second portion of the first display region, the second portion of the first display region being spatially aligned with the second virtual trackpad portion of the second display region; and responsive to receiving second input in the second virtual trackpad portion of the second display region, process the second input in a context of the second application or provide the second input to the second application.

19. The computer-readable storage medium of claim 18, having further computer-executable instructions stored thereupon to:

detect a user input gesture originating at a location in a third portion of the second display region and terminating in the first virtual trackpad portion of the second display region or the second virtual trackpad portion of the second display region; and responsive to detecting the user input gesture, perform a command, the command selected based, at least in part, upon the location in the third portion at which the user input gesture originated.

20. The computer-readable storage medium of claim 18, wherein the first portion of the first display region and the first virtual trackpad portion of the second display region have a first width and wherein the second portion of the first display region and the second virtual trackpad portion of the second display region have a second width.

\* \* \* \* \*